US008601555B2

(12) United States Patent
Qin et al.

(10) Patent No.: US 8,601,555 B2
(45) Date of Patent: *Dec. 3, 2013

(54) SYSTEM AND METHOD OF PROVIDING DOMAIN MANAGEMENT FOR CONTENT PROTECTION AND SECURITY

(75) Inventors: Xiangping Qin, San Jose, CA (US); Harkirat Singh, Santa Clara, CA (US); Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1336 days.

This patent is subject to a terminal disclaimer.

(21) Appl. No.: 11/948,888

(22) Filed: Nov. 30, 2007

(65) Prior Publication Data

US 2008/0134309 A1 Jun. 5, 2008

Related U.S. Application Data

(60) Provisional application No. 60/872,947, filed on Dec. 4, 2006, provisional application No. 60/875,432, filed on Dec. 18, 2006.

(51) Int. Cl.
*H04L 29/06* (2006.01)
(52) U.S. Cl.
USPC ............................................. 726/6; 713/156
(58) Field of Classification Search
USPC .............................................. 726/6; 713/156
See application file for complete search history.

(56) References Cited

U.S. PATENT DOCUMENTS

| | | | |
|---|---|---|---|
| 5,533,127 A | 7/1996 | Luther | |
| 5,592,611 A | 1/1997 | Midgely et al. | |
| 5,892,900 A | 4/1999 | Ginter et al. | |
| 5,903,882 A * | 5/1999 | Asay et al. | 705/44 |
| 6,223,291 B1 * | 4/2001 | Puhl et al. | 726/28 |
| 6,285,774 B1 | 9/2001 | Schumann et al. | |
| 6,757,851 B1 | 6/2004 | Park et al. | |
| 6,801,782 B2 | 10/2004 | McCrady et al. | |
| 7,082,200 B2 | 7/2006 | Aboba et al. | |
| 7,123,627 B2 | 10/2006 | Kowalski | |
| 7,143,443 B2 | 11/2006 | Song et al. | |
| 7,146,626 B1 | 12/2006 | Arsenault et al. | |
| 7,299,063 B2 | 11/2007 | Kurihara | |

(Continued)

FOREIGN PATENT DOCUMENTS

| | | |
|---|---|---|
| EP | 1521422 A2 | 4/2005 |
| EP | 1597895 A2 | 11/2005 |

(Continued)

OTHER PUBLICATIONS

Digital Control Protection LLC, High-Bandwidth Digital Content Protection System, Rev. 1.1, Jun. 9, 2003, pp. 1-85.

(Continued)

*Primary Examiner* — Michael Pyzocha
(74) *Attorney, Agent, or Firm* — Kenneth L. Sherman, Esq.; Michael Zarrabian, Esq.; Sherman & Zarrabian LLP

(57) ABSTRACT

A system and method of providing domain management for content protection and security is disclosed. A secure device domain is generated to allow sharing of content among a plurality of consumer electronic devices. A domain management scheme for authenticating and managing consumer electronics devices in the secure device domain is provided.

42 Claims, 20 Drawing Sheets

(56) References Cited

U.S. PATENT DOCUMENTS

| | | | |
|---|---|---|---|
| 7,320,069 B1 | 1/2008 | Sundharraj et al. | |
| 7,623,448 B1 | 11/2009 | Vrzic et al. | |
| 7,653,713 B2 | 1/2010 | Han et al. | |
| 7,676,219 B2 | 3/2010 | Williams et al. | |
| 7,721,300 B2 | 5/2010 | Tipton et al. | |
| 7,886,344 B2* | 2/2011 | Wei et al. | 726/6 |
| 7,936,782 B2 | 5/2011 | Qin et al. | |
| 2001/0053699 A1 | 12/2001 | McCrady et al. | |
| 2002/0157002 A1 | 10/2002 | Messerges et al. | |
| 2002/0194209 A1* | 12/2002 | Bolosky et al. | 707/205 |
| 2003/0063745 A1 | 4/2003 | Boykin et al. | |
| 2003/0105956 A1* | 6/2003 | Ishiguro et al. | 713/158 |
| 2003/0179909 A1* | 9/2003 | Wong et al. | 382/115 |
| 2004/0039906 A1* | 2/2004 | Oka et al. | 713/156 |
| 2004/0088541 A1* | 5/2004 | Messerges et al. | 713/156 |
| 2004/0103312 A1 | 5/2004 | Messerges et al. | |
| 2004/0156354 A1 | 8/2004 | Wang et al. | |
| 2004/0193919 A1* | 9/2004 | Dabbish et al. | 713/201 |
| 2004/0216150 A1* | 10/2004 | Scheifler et al. | 719/330 |
| 2004/0258244 A1 | 12/2004 | Haq et al. | |
| 2005/0090259 A1 | 4/2005 | Jain et al. | |
| 2005/0094809 A1 | 5/2005 | Pedlow et al. | |
| 2005/0144468 A1 | 6/2005 | Northcutt et al. | |
| 2005/0229004 A1* | 10/2005 | Callaghan | 713/185 |
| 2006/0002361 A1 | 1/2006 | Webster et al. | |
| 2006/0015716 A1* | 1/2006 | Thornton et al. | 713/155 |
| 2006/0020784 A1* | 1/2006 | Jonker et al. | 713/157 |
| 2006/0021065 A1* | 1/2006 | Kamperman et al. | 726/28 |
| 2006/0025124 A1 | 2/2006 | Matsumoto | |
| 2006/0092893 A1 | 5/2006 | Champion et al. | |
| 2006/0129855 A1 | 6/2006 | Rhoten et al. | |
| 2006/0155855 A1* | 7/2006 | Hamai | 709/227 |
| 2006/0177066 A1* | 8/2006 | Han et al. | 380/277 |
| 2007/0061875 A1* | 3/2007 | Le Buhan et al. | 726/10 |
| 2007/0135134 A1 | 6/2007 | Patrick | |
| 2007/0240191 A1 | 10/2007 | Singh et al. | |
| 2007/0291939 A1 | 12/2007 | Singh et al. | |
| 2008/0031136 A1 | 2/2008 | Gavette et al. | |
| 2008/0052388 A1* | 2/2008 | Korkishko et al. | 709/223 |
| 2008/0133414 A1 | 6/2008 | Qin et al. | |
| 2008/0172719 A1* | 7/2008 | Zhang et al. | 726/1 |
| 2009/0225669 A1 | 9/2009 | Qin et al. | |
| 2009/0228983 A1 | 9/2009 | Qin et al. | |
| 2009/0235330 A1 | 9/2009 | Byun et al. | |
| 2009/0254980 A1 | 10/2009 | Kanaparti | |

FOREIGN PATENT DOCUMENTS

| | | | |
|---|---|---|---|
| KR | 1020050084822 A | 8/2005 | |
| KR | 1020060057515 A | 5/2006 | |
| KR | 1020060107424 A | 10/2006 | |
| KR | 1020060057515 | 6/2008 | |
| WO | WO 91/07850 | 5/1991 | |
| WO | WO 02/86725 A1 | 10/2002 | |
| WO | WO 03/094533 | 11/2003 | |
| WO | WO 2004/027588 | 4/2004 | |
| WO | 2005034521 A1 | 4/2005 | |
| WO | WO 2005/034521 | 4/2005 | |
| WO | WO 2006/083141 | 8/2006 | |
| WO | WO 2006/107185 A1 | 10/2006 | |

OTHER PUBLICATIONS

Digital Video Broadcasting (DVB); Content Protection & Copy Management, DVB Document A094; Nov. 2005, pp. 1-103.

FreshNews.com, SiBEAM Receives Equity Investment from Best Buy, http://freshnews.com/print/node/261440, Jan. 4, 2010, 2 pages.

Hachman, "CE Giants back Amimon's Wireless HDTV Tech," online: www.pcmag.com, 1 page, Jul. 23, 2008.

Hitachi et al., DTCP vol. 1, Supplement E, Mapping DTCP to IP (Informational Version) Revision 1.2; http://www.dtcp.com, Jun. 2007, pp. 1-46.

Hitachi et al., High-Definition Multimedia Interface (HDMI) Specifications version 1.2, Aug. 22, 2005, pp. 1-214.

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), IEEE Computer Society, 1232 pages, (Jun. 12, 2007).

LG Electronics Inc., WirelessHD Specification Version 1.0 Overview, Oct. 9, 2007, 77 pages.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

Podesser et al., Selective Bitplane Encryption for Secure Transmission of Image Data in Mobile Environments, CD-Rom Proceedings of the 5th IEEE Nordic Signal Processing Symposium (NORSIG 2002), Tromo-Trondheim, Norway, Oct. 2002, IEEE Norway Section, pp. 1-6.

European Search Report [Supplementary] dated Dec. 3, 2009 for Application No. EP 07851215, filed Dec. 4, 2007.

International Preliminary Report on Patentability dated Jun. 10, 2009 for PCT/KR2007/006224, filed Dec. 4, 2007.

International Search Report dated Feb. 21, 2008 for PCT/KR07/006228, filed Dec. 4, 2007.

International Preliminary Report on Patentability and Written Opinion dated Jun. 10, 2009 for PCT/KR07/006228, filed Dec. 4, 2007.

International Search Report dated May 26, 2007 for PCT/KR2007/000828, filed Feb. 15, 2007.

International Preliminary Report on Patentability dated Aug. 19, 2008 for PCT/KR2007/000828, filed Feb. 15, 2007.

International Search Report dated Dec. 18, 2007 for PCT/KR2007/002438, filed May 18, 2007.

International Preliminary Report on Patentability dated Sep. 22, 2009 for PCT/KR2007/002438, filed May 18, 2007.

U. S. Office Action dated Dec. 7, 2009 for U.S. Appl. No. 12/044,712, filed Mar. 7, 2008.

International Search Report dated Feb. 18, 2008 for International Application No. PCT/KR2007/006224.

Caetano, Lianne, SiBEAM—60 GHz Architecture for Wireless Video Display, SiBEAM, Inc. White Paper, Mar. 2006, [Available online: http://www.sibeam.com/whtpapers/60_GHz_for_WirelessHD_3_06.pdf], pp. 1-6.

Office Action dated Apr. 13, 2010 in U.S. Appl. No. 11/706,897, filed Feb. 13, 2007.

Tosun et al., Efficient Multi-Layer Coding and Encryption of MPED Video Streams, IEEE 2000, pp. 119-122.

Tosun et al., Lightweight Security Mechanisms for Wireless Video Transmission, IEEE 2001, pp. 157-161.

U.S. Non-final Office Action for U.S. Appl. No. 12/044,221 mailed Nov. 12, 2010.

U.S. Non-final Office Action for U.S. Appl. No. 11/948,742 mailed Dec. 14, 2010.

Korean Decision to Grant dated Apr. 23, 2010 issued in Korean Patent Application No. 10-2007-0125181 from Korean Intellectual Property Office, pp. 1-2, Seo-gu, Daejeon, Republic of Korea.

Digital Transmission Licensing Administrator (DTLA), "DTLA Home Page," DTLA website, p. 1, United States, downloaded from http://www.dtcp.com on Oct. 24, 2008.

Korean Office Action dated Nov. 30, 2009 issued in Korean Patent Application No. 10-2007-0125181 from Korean Intellectual Property Office, pp. 1-3, Seo-gu, Daejeon, Republic of Korea.

European Office Action dated Mar. 2, 2010 issued in European Patent Application No. 07851215.9 from European Patent Office, pp. 1-4, The Netherlands.

Korean Office Action dated May 25, 2009 issued in Korean Patent Application No. 10-2007-0125181 from Korean Intellectual Property Office, pp. 1-3, Seo-gu, Daejeon, Republic of Korea.

Korean Final Office Action dated Jan. 12, 2010 issued in Korean Patent Application No. 10-2007-0125182 from Korean Intellectual Property Office, pp. 1-2, Seo-gu, Daejeon, Republic of Korea.

(56) References Cited

OTHER PUBLICATIONS

Korean Office Action dated Oct. 28, 2009 issued in Korean Patent Application No. 10-2007-0125182 from Korean Intellectual Property Office, pp. 1-3, Seo-gu, Daejeon, Republic of Korea.
U.S. Restriction Requirement for U.S. Appl. No. 11/948,742 mailed Aug. 25, 2010.
U.S. Final Office Action for U.S. Appl. No. 11/948,742 mailed May 27, 2011.
U.S. Final Office Action for U.S. Appl. No. 12/044,221 mailed Apr. 28, 2011.
U.S. Notice of Allowance for U.S. Appl. No. 12/044,221 mailed Sep. 20, 2011.

* cited by examiner

| 502 - ROOT_PUBLIC_KEY |
| --- |
| 504 - EXPIRATION_DATE |
| ... |
| 506 - SIGNATURE OF FIELDS ABOVE |

| 600 - DEVICE_ID |
| --- |
| 602 - DEVICE_PUBLIC_KEY |
| 604 - EXPIRATION_DATE |
| ... |
| 606 - SIGNATURE OF FIELDS ABOVE |

FIG. 6

| 700 - DOMAIN_COORDINATOR_ID |
| --- |
| 702 - DOMAIN_COORDINATOR_PUBLIC_KEY |
| 704 - EXPIRATION_DATE |
| ... |
| 706 - SIGNATURE OF FIELDS ABOVE |

| 700 - DOMAIN_COORDINATOR_ID |
|---|
| 702 - DOMAIN_COORDINATOR_PUBLIC_KEY |
| 600 - DEVICE_ID |
| 602 - DEVICE_PUBLIC_KEY |
| 802 - EXPIRATION_DATE |
| ... |
| 804 - SIGNATURE OF FIELDS ABOVE |

*FIG. 8*

| 600(1) - DEVICE_ID_1 |
|---|
| 602(1) - DEVICE_PUBLIC_KEY_1 |
| 600(2) - DEVICE_ID_2 |
| 602(2) - DEVICE_PUBLIC_KEY_2 |
| 902 - EXPIRATION_DATE |
| ... |
| 904 - SIGNATURE OF FIELDS ABOVE |

*FIG. 9*

| 700 - DOMAIN_COORDINATOR_ID |
|---|
| 702 - DOMAIN_COORDINATOR_PUBLIC_KEY |
| 600 - DEVICE_ID |
| 602 - DEVICE_PUBLIC_KEY |
| 2000 - DEVICE_PRIVILEGE |
| 2002 - EXPIRATION_DATE |
| ... |
| 2004 - SIGNATURE OF FIELDS ABOVE |

| 2100 - PRIV_DEVICE_ID |
|---|
| 2102 - PRIV_DEVICE_PUBLIC_KEY |
| 600 - DEVICE_ID |
| 602 - DEVICE_PUBLIC_KEY |
| 2104 - EXPIRATION_DATE |
| ... |
| 2106 - SIGNATURE OF FIELDS ABOVE |

415

FIG. 21

SYSTEM AND METHOD OF PROVIDING DOMAIN MANAGEMENT FOR CONTENT PROTECTION AND SECURITY

CROSS-REFERENCE TO RELATED APPLICATIONS

This application claims the benefit of U.S. Provisional Patent Application Nos. 60/872,947 (filed on Dec. 4, 2006) and 60/875,432 (filed on Dec. 18, 2006). Each of the above-referenced provisional applications is incorporated by reference herein in its entirety.

BACKGROUND OF THE INVENTION

1. Field of the Invention

This application relates to wireless communications. More particularly, this application is related to a domain management scheme for authenticating and managing consumer electronics devices in a wireless communications environment.

2. Description of the Related Technology

In recent years, consumer electronics devices have increased both in functionality and popularity. Devices such as MP3 players have increased in storage capability such that they can store many songs at one time. Although personal computers and other devices having mass storage capability have become useful for storing digital multimedia files in digital multimedia libraries, due to their lack of media features and portability, consumers often wish to enjoy the stored digital media content via more portable and specialized and feature-rich consumer electronics devices such as MP3 players, digital video recorders (DVRs), laptop computers, high definition televisions (HDTVs), DVD players, and the like. To provide consumers with content portability, various schemes have been developed to enable the transfer of data between devices. One known scheme for sharing data wirelessly is 802.11, is the wireless local area network (WLAN) standard developed by the IEEE LAN/MAN Standards Committee (IEEE 802) in the 5 GHz and 2.4 GHz public spectrum bands. Because data transmissions using wireless technologies are over the air, they are susceptible to being intercepted and misappropriated if not adequately protected. Moreover, because accessing a wireless network can be accomplished without a wired connection, wireless security schemes such as Wired Equivalent Privacy (WEP), Wi-Fi Protected Access (WPA), and Robust Security Networks (WPA2/RSN) have been developed which limit access to wireless networks.

As content has become more digitized, it also becomes more susceptible to data piracy, as unauthorized copying and sharing of unprotected digital content is easily achieved using file sharing networks and other transmission media. As a result, digital rights management (DRM) systems have been created which give content providers control over redistribution and access to copyrighted material by limiting the ability of consumers to make unlimited copies of digital content and in some cases by limiting the devices on which digital content may be stored. There is a tension between the need for consumers of digital content to be able to legitimately and easily share content among their own devices and the need of content owners and providers to limit the ability to commit data piracy that is not adequately addressed by existing technologies.

SUMMARY OF CERTAIN INVENTIVE ASPECTS

The system, method, and devices of the present invention each have several aspects, no single one of which is solely responsible for its desirable attributes. Without limiting the scope of this invention, several of its features will now be discussed briefly.

In one embodiment, a method of providing a secure device domain for sharing content among a plurality of consumer electronic devices is provided. The method includes storing a domain certificate including a domain coordinator identifier, a domain coordinator public key, and a digital signature of the domain coordinator identifier and the domain coordinator public key in a memory of a first consumer electronics device. A request is received from a second consumer electronics device to join the secure device domain and data is received which is indicative of an approval of the request. In response to the approval of the request, a device domain certificate is issued to the second consumer electronics device, the device domain certificate comprising the domain coordinator identifier, the domain coordinator public key, a device identifier of the second consumer electronics device, a device public key of the second consumer electronics device, and a digital signature of the domain coordinator identifier, the domain coordinator public key, the device identifier, and the device public key.

In another embodiment, a method for authenticating a first consumer electronics device to a second consumer electronics device in a device domain having a plurality of consumer electronics devices is provided. The method includes receiving, at the first consumer electronics device, a device domain certificate from the second consumer electronics device and verifying, at the first consumer electronics device, a domain manager's signature of the received device domain certificate. The method further includes comparing, by the first consumer electronics device, data extracted from the received device domain certificate to a certificate revocation list; and establishing, by the first consumer electronics device, a connection with the second consumer electronics device if the data extracted from the device domain certificate is not found in the certificate revocation list.

In yet another embodiment, a system for providing a secure domain for sharing content among a plurality of consumer electronic devices is provided. The system includes a domain certificate data structure including a domain coordinator identifier, a domain coordinator public key, and a digital signature of the domain coordinator identifier and the domain coordinator public key; and a device domain certificate data structure including the domain coordinator identifier, the domain coordinator public key, a device identifier, a device public key, and a digital signature of the domain coordinator identifier, the domain coordinator public key, the device identifier, and the device public key. The system further includes a certificate revocation data structure comprising at least one device identifier of a device removed from the secure domain, a device public key of the device removed from the secure domain, and a digital signature of the device identifier of the device removed from the secure domain and the device public key of the device removed from the secure domain, and a first maximal value data structure comprising a total number of device domain certificates which can be issued for the domain and a second maximal value data structure comprising a total number of unrevoked certificates issued for the domain.

In still another embodiment, a device for managing access to a consumer electronics device domain is provided. The device includes domain management software which when executed by a processor receives a device certificate from a consumer electronics device to be added to the device domain. The software further displays a message seeking confirmation that the device certificate is authentic and generates a device domain certificate in response to data input, the device domain certificate comprising data identifying the consumer electronics device domain and the device. The device domain certificate is transmitted to the consumer electronics device.

In yet another embodiment, a method of providing a secure device domain for sharing content among a plurality of consumer electronic devices is provided. The method comprises storing a domain certificate including a domain coordinator identifier, a domain coordinator public key, and a digital signature of the domain coordinator identifier and the domain coordinator public key in a memory of a first consumer electronics device and receiving a request from a second consumer electronics device to join the secure device domain. The method further includes receiving data indicative of an approval of the request. In response to the approval of the request, a device domain certificate is issued to the second consumer electronics device, the device domain certificate comprising the domain coordinator identifier, a device identifier of the second consumer electronics device, and the signature of a hash value.

BRIEF DESCRIPTION OF THE DRAWINGS

In this description, reference is made to the drawings wherein like parts are designated with like numerals throughout.

FIG. 5 is a diagram of an exemplary root certificate.

FIG. 6 is a diagram of an exemplary device certificate.

FIG. 7 is a diagram of an exemplary domain certificate.

FIG. 8 is a diagram of an exemplary device domain certificate.

FIG. 9 is a diagram of an exemplary certificate revocation list.

FIG. 20 is a diagram of an exemplary device domain certificate which defines a privilege level for a device.

FIG. 21 is a diagram of an exemplary device extended domain certificate that may be issued by a privileged device.

DETAILED DESCRIPTION OF CERTAIN INVENTIVE EMBODIMENTS

Various aspects and features of the invention will become more fully apparent from the following description and appended claims taken in conjunction with the foregoing drawings. Certain embodiments provide a method and system for secure transmission of uncompressed high definition (HD) video information from a sender to a receiver over wireless channels. Example implementations of the embodiments in a wireless HD audio/video (A/V) system will now be described.

Figure 1:
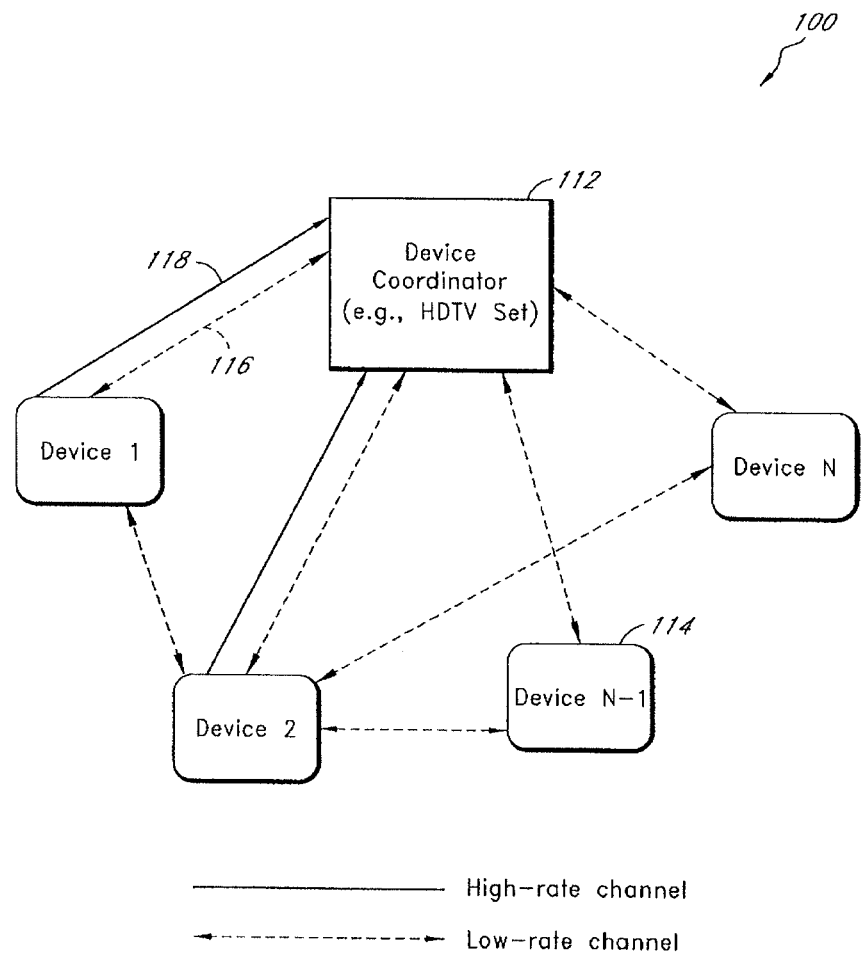
FIG. 1 is a functional block diagram of a wireless network that implements uncompressed high definition (HD) video transmission between wireless devices, according to one embodiment of the system and method.

FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-Gbps bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgment (ACK) frames. For example, the low-rate channel 116 can transmit an acknowledgment from the HDTV to the set-top box. It is also possible that some low-rate data like audio and compressed video can be transmitted on the low-rate channel between two devices directly. Time division duplexing (TDD) is applied to the high-rate and low-rate channels. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
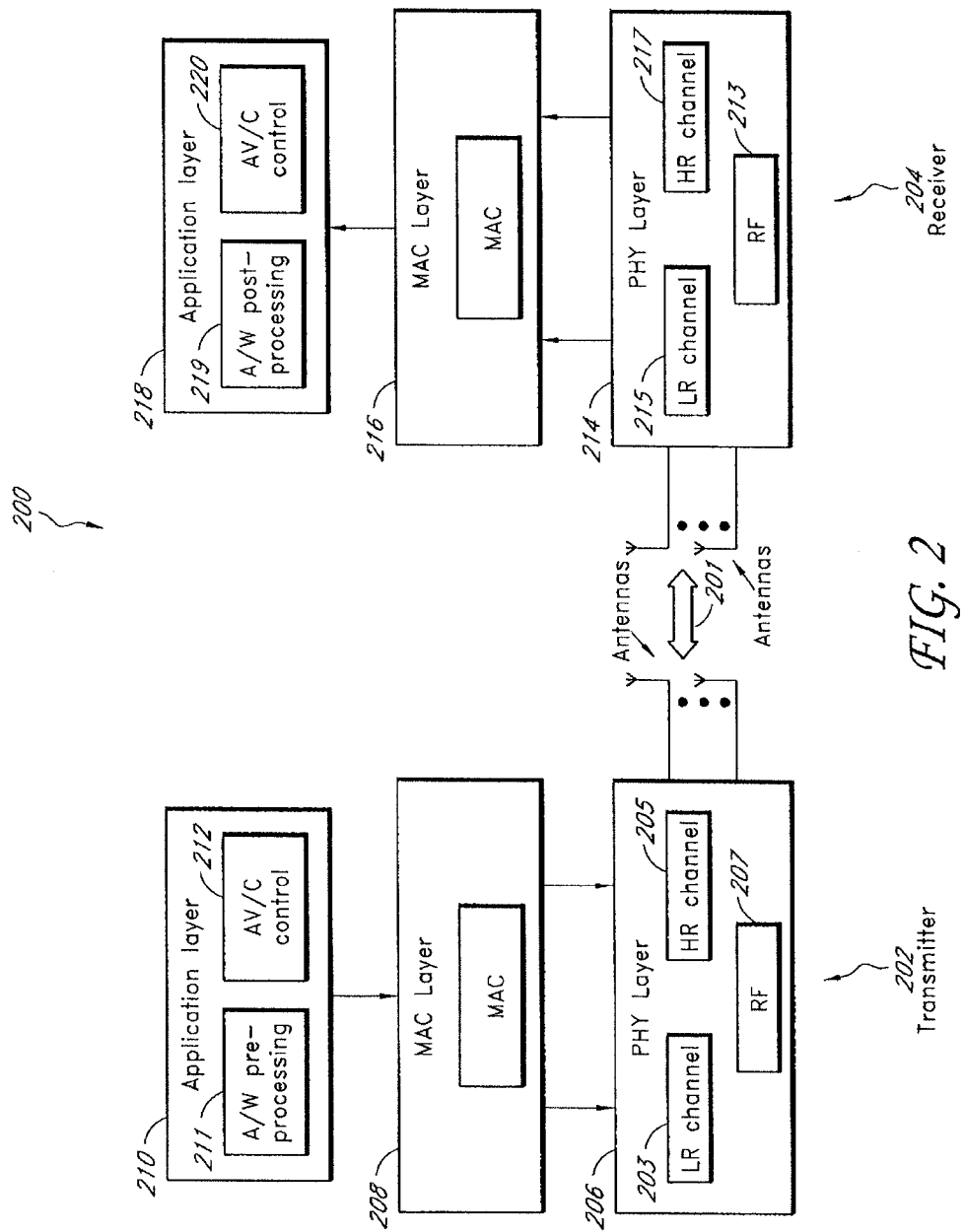
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
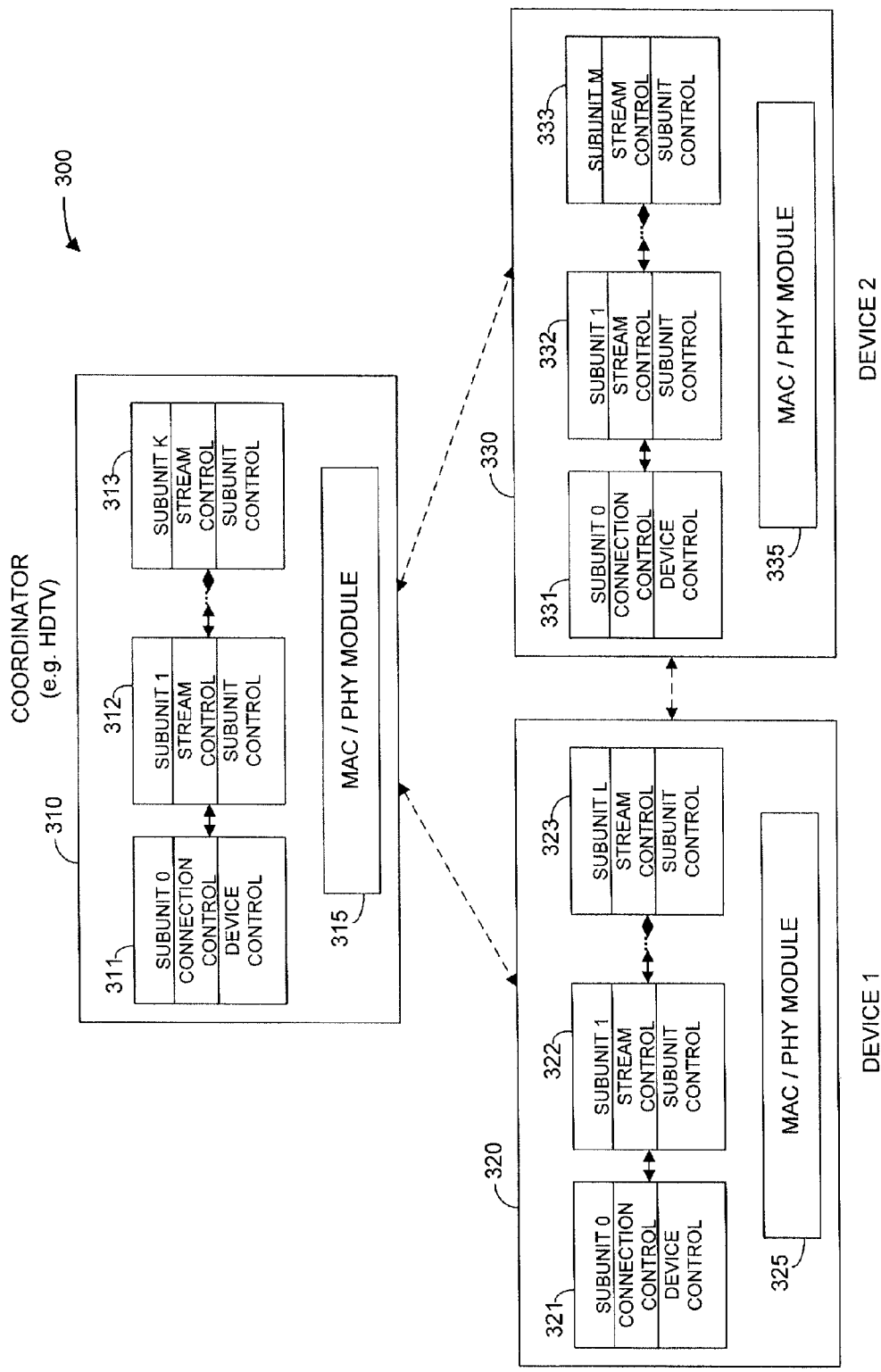
FIG. 3 is a functional block diagram of a communication system including wireless devices for wireless transmission of audio/video (A/V) data.

FIG. 3 is a functional block diagram of a communication system 300 including wireless devices for wireless transmission of audio/video (A/V) data, according to one embodiment. The communication system 300 includes a coordinator 310, a first device 320, and a second device 330. In one embodiment, the coordinator 310 is a high definition television (HDTV) with coordination capability. The first and second devices 320, 330 can be any suitable types of audio and/or video devices which can be in wireless communication with each other and with the coordinator 310. In other embodiments, the number of wireless devices can vary widely depending on the system design. In the illustrated system 300, A/V communication is possible between the coordinator 310 and the first and second devices 320, 330 and between the first and second devices 320, 330.

In the illustrated embodiment, each of the coordinator 310 and the first and second devices 320, 330 includes a plurality of subunits. Among the subunits, a first subunit 311, 321, 331 (e.g., subunit 0 in the illustrated embodiment) of each device 310, 320, 330 serves to provide A/V control (e.g., connection control and/or device control) with other devices. The first subunit 311, 321, 331 can also serve to provide device control among the other subunits within the device. Other subunits 312, 313, 322, 323, 332, 333 in each device can provide various functions, such as monitor, audio player (e.g., CD player), printer, DVD player, video tape recorder/player, tuner, and camera functions. Each subunit of a device can be connected to a subunit of another device individually through a device control mechanism (not shown). Each of the devices 310, 320, 330 can also include data storage for storing audio/video control information including, but not limited to, connection control information and device control information. The data storage can include any suitable memory device.

Each of the coordinator 310 and the devices 320, 330 also includes a MAC/PHY module for providing a wireless connection with the other devices. The MAC/PHY module serves to process and send AV data in a format suitable for wireless transmission. In addition, the MAC/PHY module of one device can negotiate with those of the other devices for channel time allocation for A/V data transmission.

In the illustrated embodiment, the coordinator 310 serves as an audio video control (AV/C) coordinator as well as a MAC layer coordinator. In other words, the coordinator 310 provides coordination over both the application and MAC layer functionalities of the devices 320, 330. Certain conventional wireless systems have an AV/C coordinator and a MAC coordinator separately, which may need extra wireless control information exchange between the AV/C coordinator and the MAC coordinator. The illustrated coordinator 310 can minimize control information exchange in the system because there is no need for such extra control information exchange.

In one embodiment, at least one of the devices 320, 330 can exchange connection control information with the coordinator 310 before transmitting A/V data or control messages to either the coordinator or the other device 320 or 330. During this stage, at least one of the devices 320, 330 can send its own connection control information to the coordinator 310. The coordinator 310 can use the information for connection between the device 320 or 330 and the coordinator 310 or for connection between the devices 320, 330. In certain embodiments, the coordinator can store the information, and use it later for a connection involving the device 320 or 330 without requesting the information again from the device. In some embodiments, the coordinator 310 can store the information of all devices in the wireless communication system 300. In such embodiments, a device in the system 300 can obtain the connection control information of other devices directly from the coordinator 310. Thus, information exchange among the devices can be minimized.

In an embodiment in which a coordinator and a device are to be connected for A/V transmission, the coordinator and the device can exchange connection control information with each other. In other embodiments in which two non-coordinator devices are to be connected for A/V transmission, the devices can exchange connection control information with each other via the coordinator. In such embodiments, if the coordinator already has the information to be exchanged, the devices can acquire the information directly from the coordinator.

During the connection control information exchange stage described above, various types of information can be exchanged among the coordinator 310 and the devices 320, 330. The connection control information can include, but is not limited to, association (availability) information, wireless video area network (WVAN) information, device capability information, format capability information, and bandwidth information. In certain embodiments, the information can include the Enhanced Extended Display Identification (E-EDID) information of a device (e.g., an audio or video sink device). The E-EDID data structure carries information on A/V formats that the device can support. Extended Display Identification Data can have a Video Electronics Standards Association (VESA) standard data format that contains basic information about a monitor and its capabilities, including vendor information, maximum image size, color characteristics, factory pre-set timings, frequency range limits, and character strings for the monitor name and serial number.

To establish an A/V transmission connection between two devices in a wireless communication system (e.g., the systems of FIGS. 1 and 3), an originator device can send a connection control information request a destination device to acquire desired connection control information for A/V transmission. Then, the destination device can process the request and return a connection control information response to the originator device, which allows the originator device to acquire the desired information. An originator or originator device refers to a device which initiates AV transmission with another device. An originator can be either a source or a sink. Destination device refers to a device which an originator targets for A/V transmission. A destination device can be either a sink if the originator is a source, or a source if the originator is a sink.

Various embodiments described herein provide a domain management framework which allows the wireless communications system 300 to securely transmit uncompressed HD video information and other types of data from a sender to a receiver over wireless channels. This secure transmission is provided by creating a local device domain in which access to the device domain is limited to those devices authenticated as being appropriate to join the domain and share data with other devices within the communications system 300. One or more of the devices within the device domain is designated the domain manager. The domain manager dispenses digital certificates to other devices which authenticate their membership in the device domain.

Figure 4:
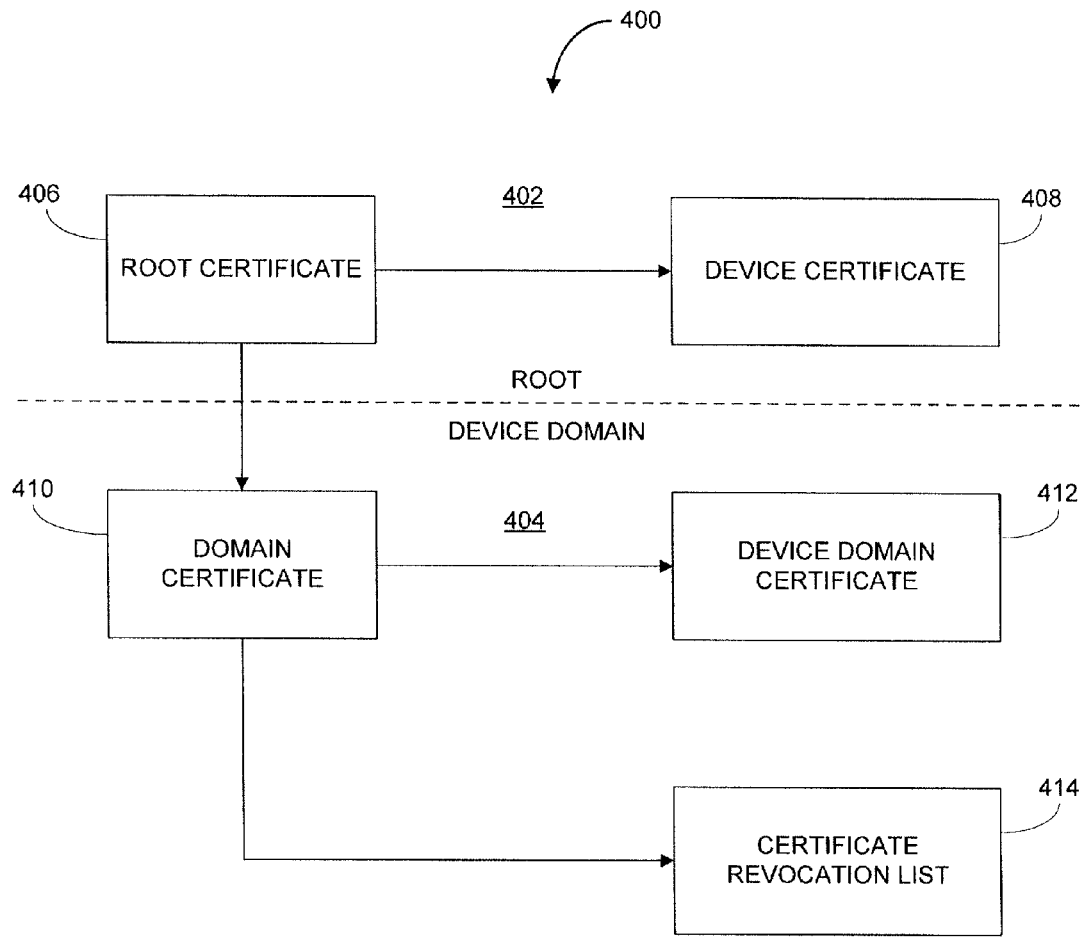
FIG. 4 is a diagram of an exemplary digital certificate chain for a device domain.

Referring now to FIG. 4, an example of a digital certificate chain 400 in accordance with certain embodiments is provided. As is known in the art, a digital certificate is generally an electronic document which incorporates a digital signature to bind together a public key with an identity. The identity may include information such as the name of a person, an organization, a device, or some other entity. The certificate is generally useful for verification that a public key belongs to an individual. The digital certificate chain 400 is a series of digital certificates which are digitally signed to verify the identities of the entities with which they are associated.

The digital certificate flow 400 includes at least two areas: a root area 402 which is external to the communication system 300 (FIG. 3) and a domain area 404 which is part of the communication system 300. The root area 402 includes a root certificate 406. The root certificate 406 typically takes the form of a signed digital certificate which authenticates the identity of a certificate authority (CA) or some other trusted party, and is discussed in more detail below in connection with FIG. 5. The certificate chain 400 also includes a device certificate 408 which is issued by the CA using the root certificate. The device certificate 408 (which is discussed in additional detail with reference to FIG. 6) is issued to a particular device and may be used to authenticate the device onto which it is installed.

The device domain area 404 of the digital certificate chain 400 relates to the devices in the communication system 300. The domain area 404 includes a domain certificate 410. The domain certificate 410 is typically requested from and issued by the root (not shown). The domain certificate 410 may be used to authenticate the combination of the domain identity (e.g., the domain of the communication system 300) and its public key, and will be discussed in further detail below in connection with FIG. 7. Also present in the domain area 404 is a device domain certificate 412. The device domain certificate 412 may be issued by the domain manager 410, to a device (such as devices 320, 330) which joins the domain managed by the domain manager 410 and its associated device (such as coordinator 310). The domain area 404 also may include a certificate revocation list 414. The certificate revocation list 414 (discussed in detail with reference to FIG. 9 below) is a list maintained with the communication system 300 which identifies the certificates which are no longer authorized to authenticate to communication system 300 having its security managed by the domain manager 410.

FIG. 5 is a more detailed view of the root certificate 406 (see FIG. 4). As noted above, the root certificate may be a "self-signed" digital certificate which is used to authenticate identity. The root certificate 406 typically includes various data which stores information related to the certificate. In the example shown in FIG. 5, the root certificate includes the public key of the root 502 and the expiration date of the certificate 504. The root certificate 406 may include other data, such as the name of the issuing organization, for example. Also included in the root certificate is a digital signature 506 of the data. The digital signature 506 is produced by the private key (not shown) corresponding to the public key 502 of the root.

Referring now to FIG. 6, a more detailed view of the device certificate 408 (see FIG. 4) is shown. The device certificate 408 may be issued by the root, and may be used to authenticate the identity of the device onto which it is installed. The device certificate 408 includes a device identifier 600 which is an identifier unique to the device. In some embodiments, the device identifier 600 may be a MAC address. In other embodiments, the device identifier may be a device serial number. The device certificate 408 may further include a device public key 602 and an expiration date 604. The device certificate 408 may also include other data (not shown) such as the type of the device, the device manufacturer, the make, the model, and other data related to the device. The device certificate 408 also includes a signature 606 of the data stored in the other fields of the device certificate 408. This signature is created by signing the data fields with the root's private key, and the root's public key may then be used to verify the device signature 606. The device certificate 408 may be stored in devices such as the coordinator 310, device 320, and device 330 as part of the device manufacturing process. The device private key corresponding to the device public key 602 may also be preinstalled onto the device. In some embodiments, this device certificate can be simply a raw public key for easy implementations.

FIG. 7 is a more detailed view of the domain certificate 410 (see FIG. 4). As noted above, the domain certificate 410 may be issued to a domain owner, such as the owner of the communications system 300 (FIG. 3; which may form a device domain). Typically, the domain certificate is issued by the root and installed on at least one designated device in the communication system 300 to serve as the domain manager. In some implementations, the coordinator 310 may be designated as the domain manager. The domain certificate 410 includes a domain coordinator identifier 700 and a domain coordinator public key 702. The domain certificate also may include an expiration date 704 which indicates how long the certificate will remain valid. Other data may also be included in the domain certificate such as, for example, the name of the domain owner, the location of the domain, or some other information related to the domain. The domain certificate additionally includes a digital signature for each of its data fields. The domain certificate data may be signed using the private key of the root. The private key corresponding to the public key of the domain coordinator may be kept in secrecy by the domain owner or the domain coordinator himself. The domain certificate 410 is used to authenticate the combination of the domain identifier and its associated public key. In some embodiments, the domain certificate 410 may be a device certificate 410 associated with the device designated as the domain manager.

FIG. 8 is a more detailed view of the device domain certificate 412 (see FIG. 4). The device domain certificate 412 is issued by the domain manager and signed by the private key of the domain certificate 410. The device domain certificate 412 includes several data fields which are related to other certificates in the certificate flow 400. For example, the device domain certificate 412 includes the domain coordinator identifier 700 associated with the domain certificate 410 in the certificate flow 400. The device domain certificate 412 also includes the public key 702 associated with the domain certificate. The device domain certificate 412 also includes a device identifier 600 and a public key 602 associated with the device identifier 600. Also included with the device domain certificate 412 may be an expiration date 802 which indicates the duration during which the certificate remains valid. The signature may be generated using the domain manager's private key. In some embodiments, for a simplified implementation, the certificate comprises, the device's ID, the domain manager's ID and the signature of a hash value. This hash value may be the hash of the concatenation of the device's ID, the domain manager's ID and the device's public key. The device domain certificate 412 is generally used to provide authentication that the specific device indicated by the device identifier 600 belongs to the domain indicated by the domain identifier 700.

FIG. 9 is a more detailed view of the certificate revocation list 414 (see FIG. 4). The certificate revocation list 414 provides the ability for the domain manager to "revoke" the device domain certificates 412 of certain devices in the domain. The certificate revocation list 414 includes a list of device identifiers 600 and their associated public keys 602 which are no longer authorized to belong to the device domain as defined by the domain area 404. In certain embodiments, instead of a public key, the hash value of the public key may be instead used. The certificate revocation list 414 also includes an expiration date 902 and is signed using the private key of the domain coordinator to produce a digital signature 904.

Certain inventive embodiments provide a simplified way for non-technical users to securely and easily add, remove, and manage devices with respect to a wireless network such as the communication system 300 described above. The domain management system described below provides several advantages over existing protocols for providing wireless network security, content protection, and digital rights management. One particular advantage is the ease with which a non-sophisticated user can add devices to the wireless network environment.

Figure 10:
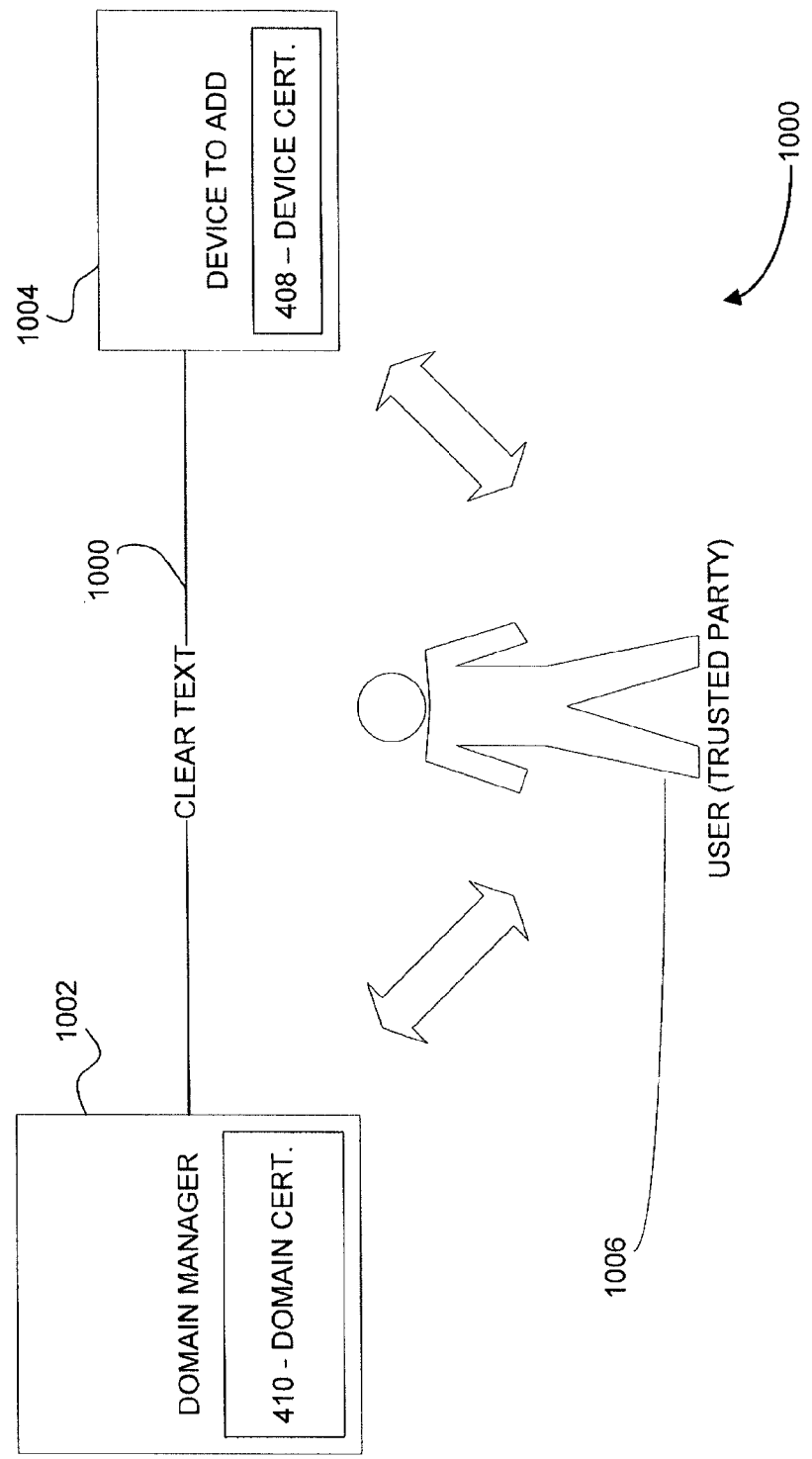
FIG. 10 is an illustration of an environment suitable for adding devices to a device domain.

FIG. 10 shows an example of an environment 1000 suitable for adding devices to a device domain such as domain 404 from FIG. 4, for example. As shown in the figure, device domain 404 includes a domain manager device 1002 (which may be a coordinator 310 or device coordinator 112, for example) which has a domain certificate 410 installed thereon (which as discussed above, may be the device certificate 408 associated with the domain manager device 1002). A new device 1004 to be added to the domain 404 may be connected to the domain manager device 1002. The new device 1004 also has a device certificate 408. The connection between the domain manager device 1002 and the new device 1004 may be a simple unencrypted wireless connection (labeled as clear text) over the wireless network 100. A user 1006 may also be present.

When a domain manager device 1002 connects to the new device 1004, it retrieves the device certificate 408 from the new device 1004. It then verifies the authenticity of the device certificate 408 of the new device 1004. In order for the authenticity of device certificate 408 of the new device 1004 to he authenticated, a trusted party is used to verify its authenticity. One example of a trusted party that may authenticate the certificate may be the issuing authority (e.g., the root) that created and signed the certificate. However, in order to have access the public key of the root, the domain manager typically must have direct access to the Internet so that it can retrieve the public key of the root to verify the device signature on the new device 1004. Such an external network connection may not always be available. Moreover, connection to an external network is not always desirable for security reasons. Thus, to avoid the necessity of connecting to a network outside of the domain area 404, another trusted party may be utilized. In the environment 1000, the user 1006 may take the role of trusted party in order to verify the authenticity of the certificate retrieved by the domain manager device 1002 from the new device 1004.

Figure 11:
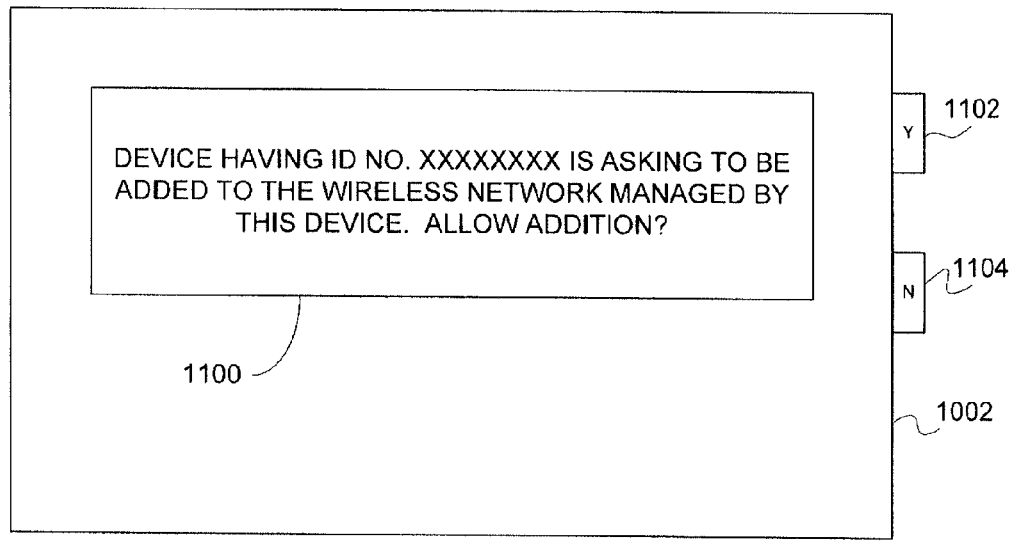
FIG. 11 is a diagram of an exemplary domain manager device.
Figure 12:
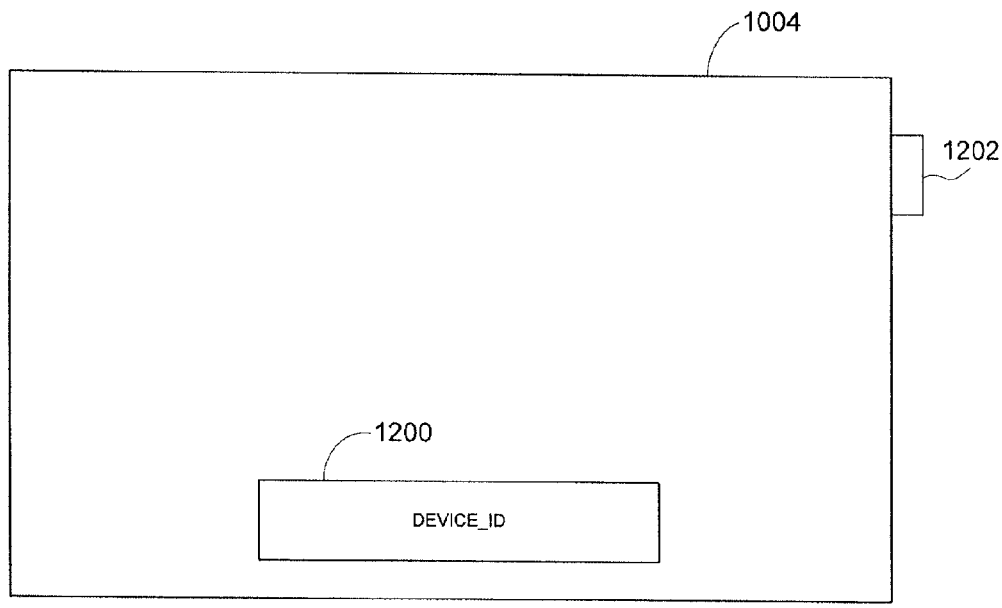
FIG. 12 is a diagram of an exemplary device which may be added to a device domain.

This verification may be accomplished in various ways. For example, the domain manager device 1002 may include a display 1100 which can prompt the user 1006 to verify the device certificate retrieved from the new device 1004 as shown in FIG. 11. The user 1006 can verify the device certificate by comparing the device identifier 600 displayed in the display 1100 against the device identifier 1200 (which may be a device serial number or MAC address) that is physically printed on the new device 1004 as shown in FIG. 12. The user 1006 may then either allow access by selecting a "Yes" button 1102 or deny access by selecting a "No" button 1104 on the domain manager device 1002. Of course, these can be soft keys, touch screen keys or alphanumeric keys such as "Y" and "N." As is apparent from FIGS. 11 and 12, the addition of a new device 1004 to the network environment 1000 can be achieved with a domain manager device 1002 that has a limited user interface (a characteristic of many consumer electronics devices).

In particular, the addition of the new device 1004 to the environment 1000 is achieved without the use of a mouse, keyboard, or other relatively sophisticated input device. Moreover, because the trusted party is the user 1006, the initial communication between the domain manager device 1002 and the new device 1004 may be in clear text and over-the-air without Jeopardizing the security of the network environment 1000. This is because if the device identifier 600 of the device certificate 406 passed from the new device 1004 to the domain manager device 1002 is modified in transit, the hash value generated from the modified fields will not match the original hash value which is signed by the private key, and a fraud can be detected.

Figure 13:
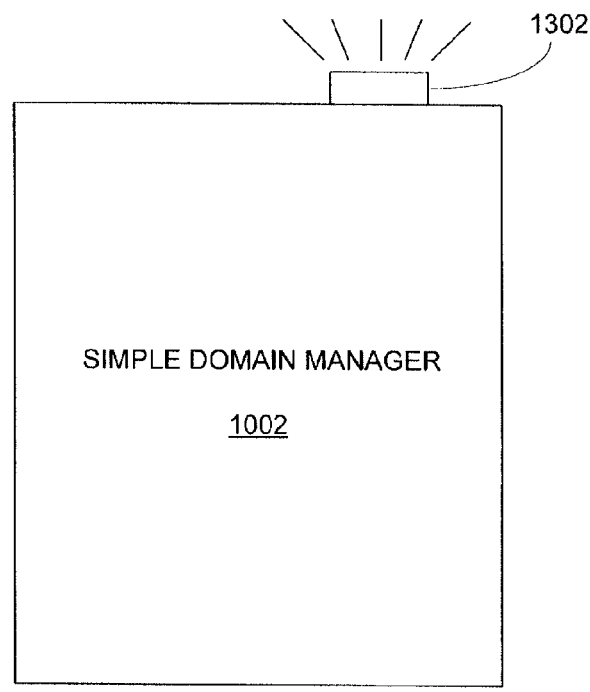
FIG. 13 is a diagram of an exemplary simplified domain manager device.

Although not as secure, an even simpler interface may be utilized by the domain manager device 1002 as shown in FIG. 13. In this embodiment, the domain manager device 1002 does not include a display, but rather includes only a user-selectable button 1302 with an indicating back light which flashes when a new device requests addition to the network. In order for the new device 1004 to be added to the environment in this configuration, the new device is brought within a proximity of the domain manager device 1002. The domain manager device 1002 retrieves the device certificate 406 from the new device 1004 and flashes the backlit button to indicate that the new device 1004 has requested addition to the device domain 404 via the network environment 1000. The user 1006, may then press the flashing button to indicate permission for the domain manager device 1002 to add the new device 1004 to the environment. Because this interface lacks a display, the device identifier 600 of the new device 1004 cannot be displayed to the user 1006 for verification. Although this technique lacks this specific verification of the device identifier described above, it nevertheless allows the user 1006 to disallow the connection by not pressing the flashing button 1302.

Once the user 1006 has verified the new device 1004 and given permission to the domain manager device 1002 to add the new device 1004 to the network environment 1000, a device domain certificate 412 is created by the domain manager device 1002 and issued to the new device 1004. As noted above in connection with FIG. 8, the device domain certificate 412 is signed by the private key of the domain certificate 410 of the domain manager device 1002. The newly created device domain certificate 412 is transmitted to the new device 1004. The new device 1004 verifies the issued certificate (using the public key 702 of the domain manager device 1002). If the new device 1004 has a display, it may also display the domain identifier 700 so that the user 1006 can confirm that it has received the device domain certificate 412 from the correct device domain. Once the user 1006 confirms that the correct device domain certificate 412 has been transmitted, the user 1006 may then instruct the new device 1004 to accept the issued certificate by pressing a button (such as button 1202 from FIG. 12) on the new device 1004.

Oftentimes, devices which are part of the device domain 404 need to be canceled from the device domain 404. For example, when a user 1006 purchases a newer MP3 player, they may decide to sell or give away their current MP3 player that is part of the device domain 404. Because the current MP3 player will no longer be used in the device domain 404, it may be desirable to remove the device identifier associated with the current MP3 player from the device domain 404. In another inventive aspect, the domain manager device 1002 may be used to cancel devices from the device domain 404 by adding them to the certificate revocation list (CRL) 414 (see FIG. 4).

Figure 14A:
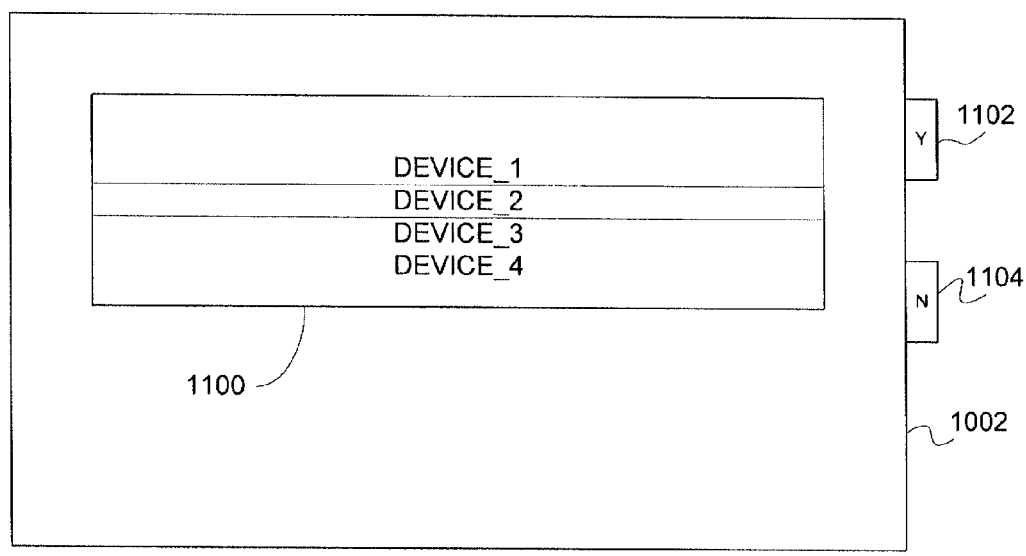
FIG. 14A is a diagram of an exemplary domain manager device removing a device from the device domain.

FIG. 14A illustrates how a simple display interface may be used to cancel devices from the domain 404. As shown in FIG. 14, the display 1100 (FIG. 11) on the domain manager device 1002 (FIG. 10) may display a list of the devices that are part of the device domain 404 (FIG. 4). The user may scroll through the list utilizing one or both of the buttons 1102 and/or 1104, or some other user interface element provided by the domain manager device 1002. As with the process of adding a device to the device domain 1004, no mouse or keyboard is necessary for the user 1006 to instruct the domain manager device 1002 to remove another device from the device domain 404. In the example shown in FIG. 14, "DEVICE_2" is highlighted. If the user 1006 selects the "Yes" button 1102, the device identifier 600 of DEVICE_2 and its associated public key 602 is added to the certificate revocation list 414. Once the device has been added to the certificate revocation list 414, the list 414 is signed by the domain manager device and broadcast to each of the other devices in the device domain 404.

In order to ensure digital rights control, the number of devices that may join a domain may be limited. In another inventive aspect, a pair of maximal values may be maintained by the domain manager 1002 which are used to limit the number of devices which can join the device domain 404. The maximal values may be stored in a memory on the domain manager device 1002. The first maximal value, places a limit on the total number of device domain certificates 412 that can be issued by the domain manager device 1002 within the device domain 404. The second maximal value places a limit on the total number of unrevoked device domain certificates 412 that can exist within the domain at any given time. The first maximal value may be determined as a function of the second maximal value. For example, the maximal values may be expressed as $\text{Max}_{Total}=2\ \text{Max}_{InService}$, where $\text{Max}_{Total}$ is the first maximal value, and $\text{Max}_{InService}$ is the second maximal value. Utilizing two maximal values allows for increased flexibility in managing devices in the device domain 404, while at the same time maintaining a degree of security that prevents an unscrupulous user from constantly switching adding and removing different devices from the domain in order to achieve unauthorized distribution of the content stored on devices in the domain. Similarly, as the number of devices in the domain may be limited, the number of domains that a device is permitted to join may also be limited to prevent widespread unauthorized distribution of content.

Figure 14B:
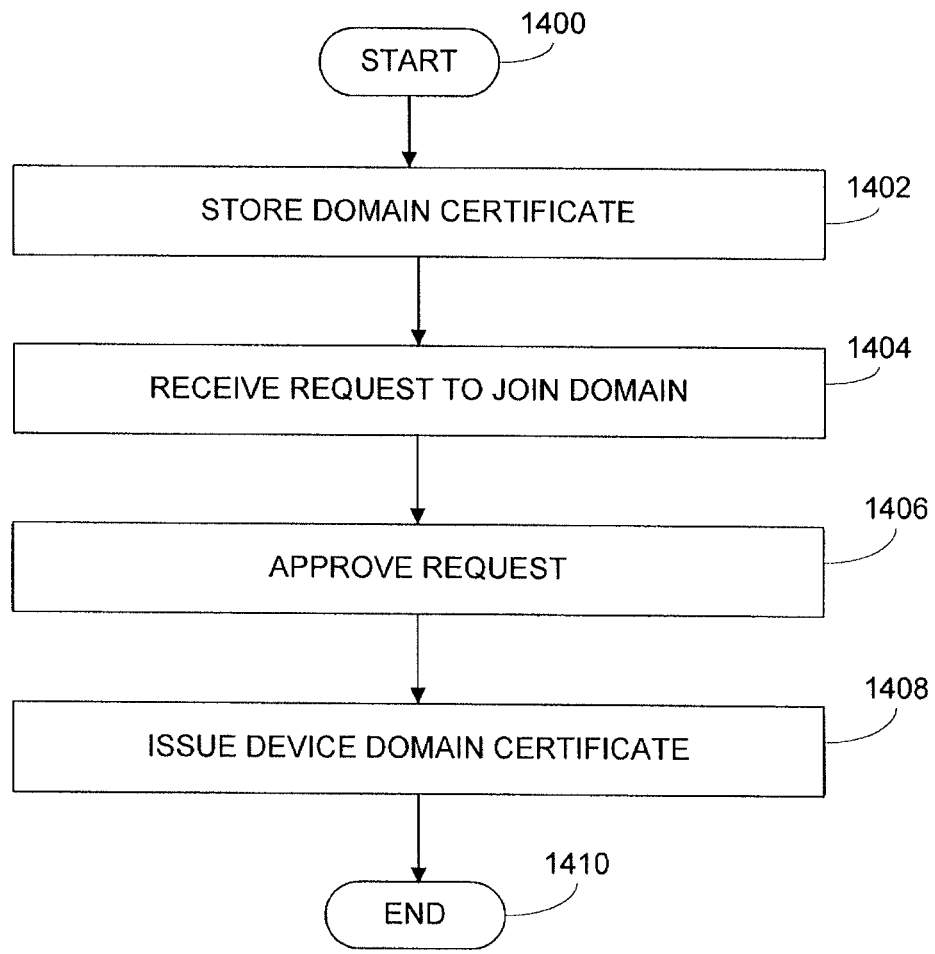
FIG. 14B is a flowchart showing a method of creating a secure device domain.

FIG. 14B is a flowchart of a method of providing a secure device domain which allows consumer electronics devices (such as devices 320 and 330 from FIG. 3) to share content. The domain manager device 1002 initiates the process at block 1400 and immediately moves to block 1402 where it stores a domain certificate 412 in its memory. Next, the process moves to block 1404, where the domain manager device 1002 receives a request to join the device domain from a second device (such as device 330, for example). At block 1406, the domain manager device 1002 then receives data which indicates that the request is approved. This data may be automatically generated or it may be input by a user. In response to the approval, the domain manager device 1002 then issues a device domain certificate 412 to the requesting device at block 1408, and the process terminates at block 1408.

Figure 15:
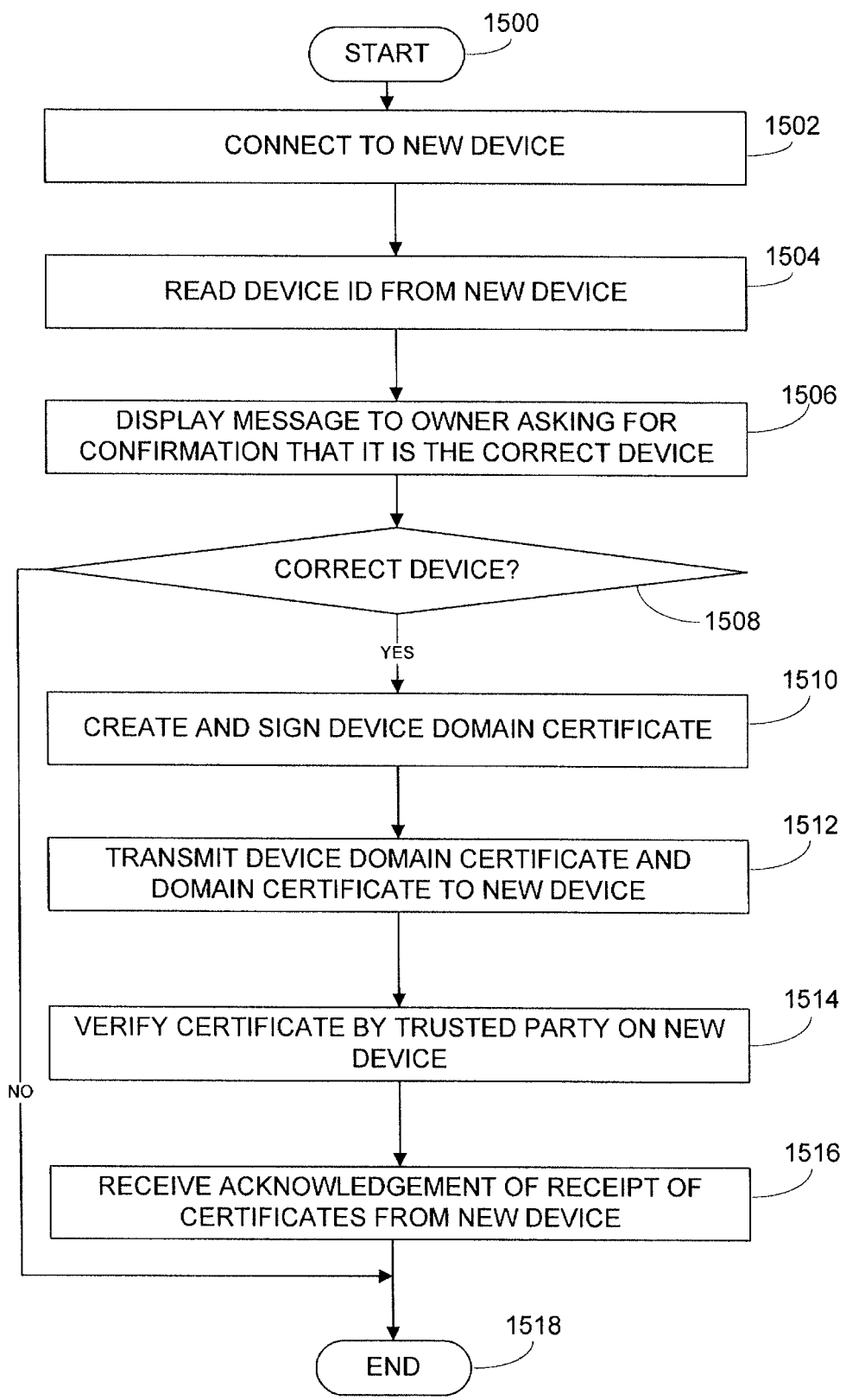
FIG. 15 is a flowchart showing a method of adding a device to a device domain.

Referring now to FIG. 15B, a flowchart illustrates a process by which a device may be added to the device domain 404 (FIG. 4) by the domain manager device 1002. The domain manager device 1002 begins the process at block 1500 and immediately moves to block 1502 where the domain manager device 1002 connects to the new device 1004 which is to be added to the domain. Next, the process moves to block 1504, where the domain manager device 1002 reads the device identifier 600 from the new device 1004. Next, at block 1506, the domain manager device 1002 displays a message on its display 1100 to the trusted party (which may be user 1006) asking for confirmation that the new device 1004 is the correct device. As noted previously, the user 1006 can confirm the new device by matching the device identifier (such as the MAC address) physically placed on a surface of the new device 1004 to the device identifier 600 read from the device certificate 408 of the new device 1004. The process then moves to decision block 1508 where the trusted party determines whether the new device 1004 is the correct device to add to the device domain 404. If the device identifier 600 from the device certificate 408 is not the correct identifier, the process terminates at block 1518. If the device identifier is correct, the process moves to block 1510, where the domain manager device 1002 generates and signs a device domain certificate for the new device 1004. As noted previously, the device domain certificate includes the domain coordinator identifier 700 (which may be the device identifier 600 of the domain manager device 1002) and the public key of the domain coordinator 702. The device domain certificate 412 also includes the device identifier 600 of the new device 1004 as well as the public key of the new device 1004. An expiration date 802 for the device domain certificate 412 may also be generated. Next, at block 1512, the domain manager device 1002 transmits the device domain certificate 412 to the new device 1004 which asks for verification from the trusted party, and upon verification of the device domain certificate at block 1514, installs the certificate. The verification of the device domain certificate 412 may be performed by the user 1006 or by another trusted party. The process then moves to block 1516, where the domain manager device 1002 receives an acknowledgement from the new device 1004 that the device domain certificate 412 has been received and installed. The process then terminates at block 1518.

Figure 16:
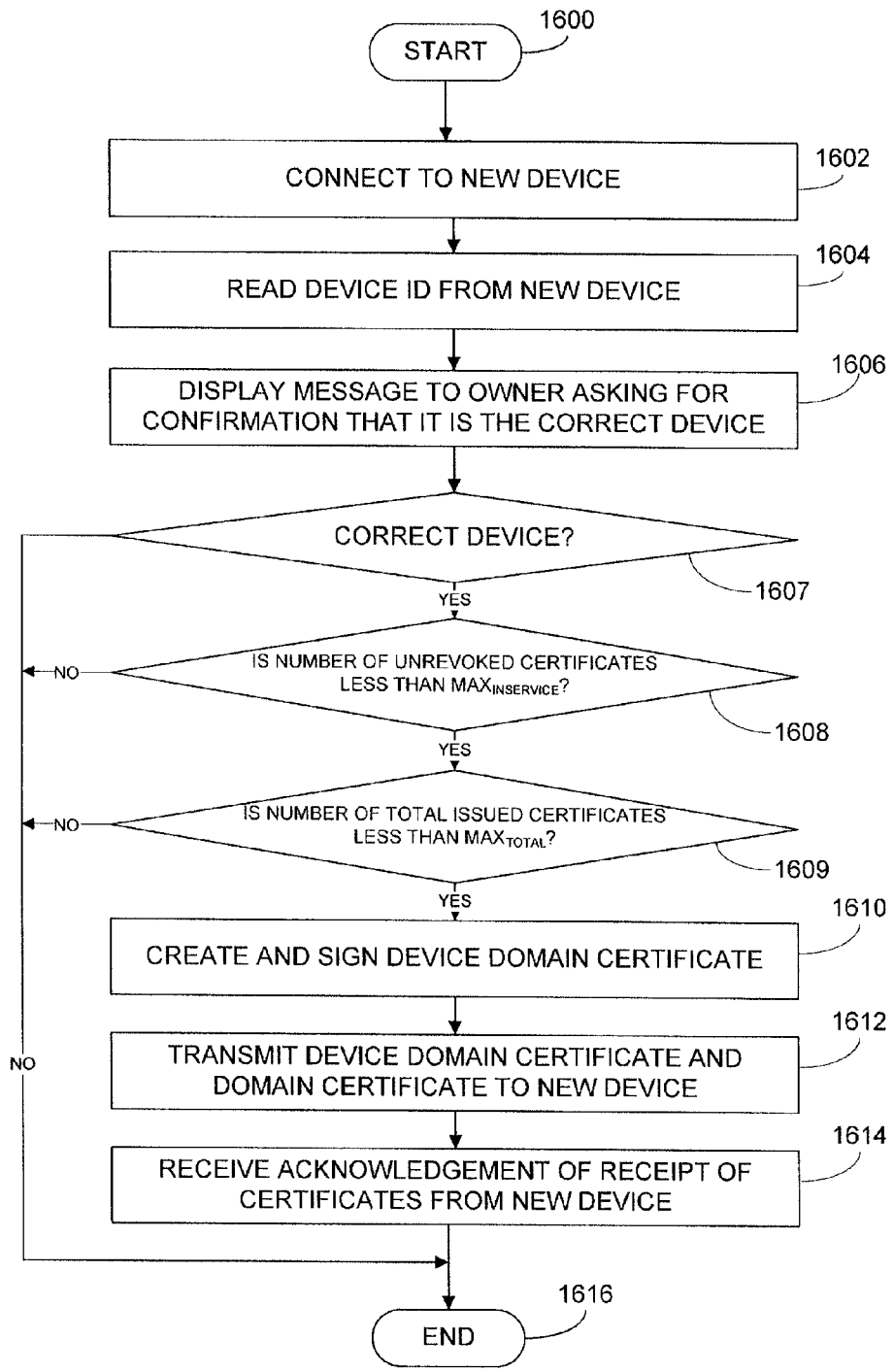
FIG. 16 is a flowchart showing another method of adding a device to a device domain.

Referring now to FIG. 16, a flowchart illustrates an alternative process by which a device may be added to device domain 404 by the domain manager device 1002. This process provides an added level of security to the device domain 404 by checking the number of issued and unrevoked certificates prior to issuing a device domain certificate 412 to the new device 1004.

The domain manger device 1002 begins the process at block 1600 and moves to block 1602 where it connects to the new device 1004. Next, at block 1604, the domain manager device 1002 reads the device identifier 600 from the new device 1004 and then displays a message on display 1100 seeking confirmation from the user 1006 that the device identifier 600 is correct at block 1606. At decision block 1607, it is determined whether the domain manager device 1002 is attempting to add the correct device. If it is not the correct device, the process jumps to terminating block 1616. If the device identifier 600 read from the device certificate 408 of the new device is correct, then the process moves to decision block 1608.

At decision block 1608, the domain manager device 1002 determines if the number of unrevoked device domain certificates is less than the number of allowed certificates MAX$_{INSERVICE}$. If the maximum number has already been reached, the process moves to termination block 1616, and no device domain certificate 412 is issued by the domain manager device 1002. If the number of unrevoked certificates is less than the maximum allowed, the process moves to decision block 1609, where the other maximal value is considered. At block 1609, the domain manager device 1002 determines whether the total number of device domain certificates 412 is still less than the MAX$_{TOTAL}$. If not, then the process terminates at block 1616 and no certificate is issued. If issuing the new certificate does not exceed the maximal values, the process then moves to block 1610, and the domain manager device 1002 generates and signs the device domain certificate 412 for the new device 1004.

Having generated the device domain certificate, at block 1612, the domain manager 1002 then transmits the certificate to the new device 1004 at which point the new device 1004 verifies the device domain certificate 412 and installs the certificate. The verification of the device domain certificate 412 may be performed by the user 1006 or by another trusted party. The process then moves to block 1614, where the domain manager device 1002 receives an acknowledgement from the new device 1004 that the device domain certificate 412 has been received and installed and the process terminates at block 1616. Once the acknowledgement has been received by the domain manager device 1002, the new device 1004 is able to authenticate with other devices in the device domain 404.

Figure 17:
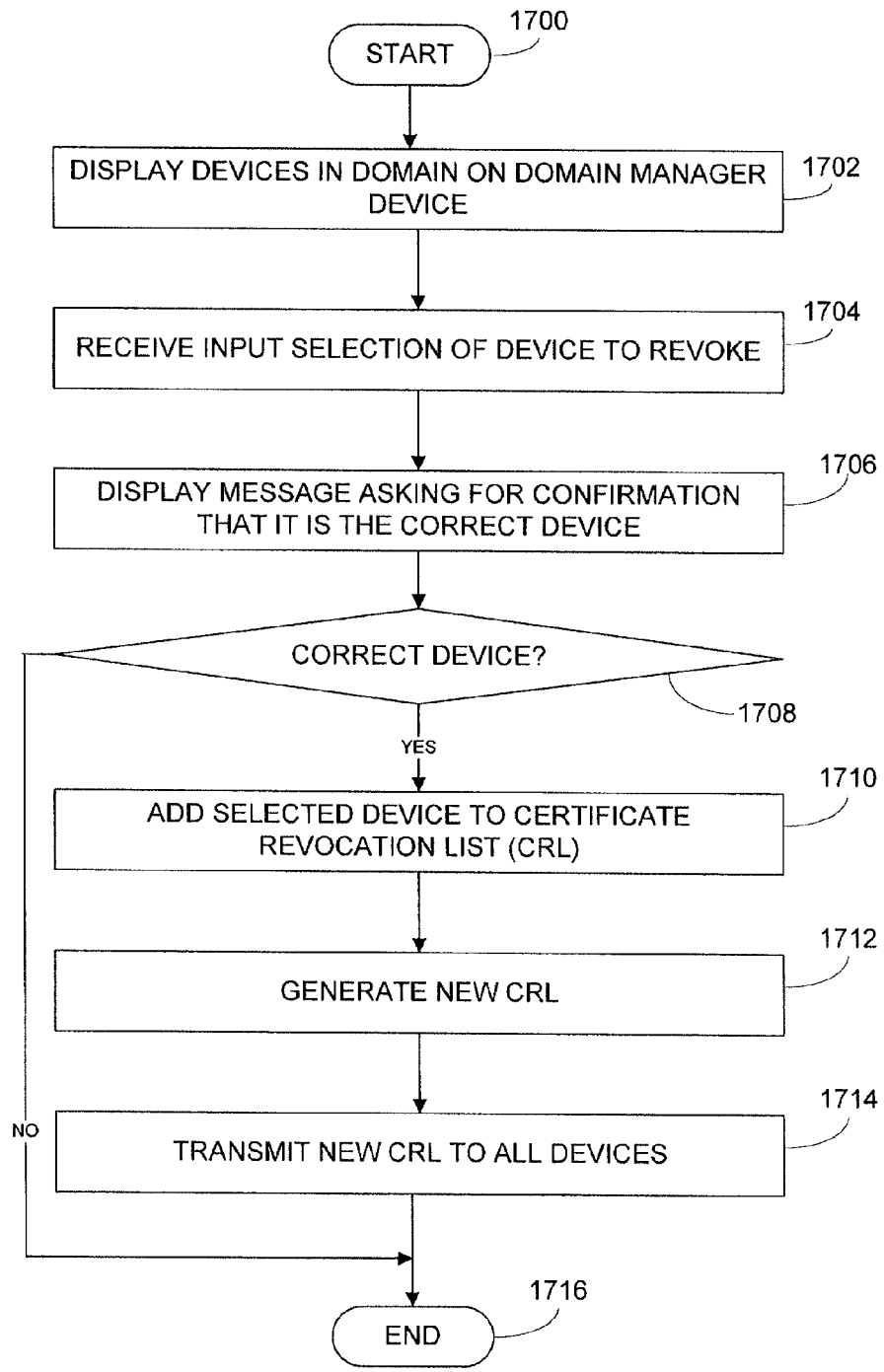
FIG. 17 is a flowchart showing a method of removing a device from a device domain.

As noted previously, the domain manager device 1002 may also have a capability for canceling devices from the device domain 404. FIG. 17 is a flowchart of one exemplary method for removing a device from the device domain 404. The domain manager device 1002 initiates this process at initiation block 1700 and immediately moves to block 1702, where the devices that are currently part of the device domain 404 are displayed on the display 1100 of the domain manager device 1002. Next, at block 1704, the user 1006 selects one of the devices for removal from the domain inputting the selection as shown in FIG. 14 above. Once the selection has been received, the process moves to block 1706, where a message may be displayed asking for confirmation that the selected device is the correct device. At decision block 1708, if the input response indicates that the device to remove is not the correct device, the process terminates at block 1716. If the device is correct device, the process then moves to block 1710, and the selected device is added to the certificate revocation list 414. The process then moves to block 1712, where a new certificate revocation list 1712 is issued. After the new certificate revocation list is issued, at block 1714, the certificate revocation lists 414 it is then transmitted to each device in the device domain and the process terminates at block 1716.

Figure 18:
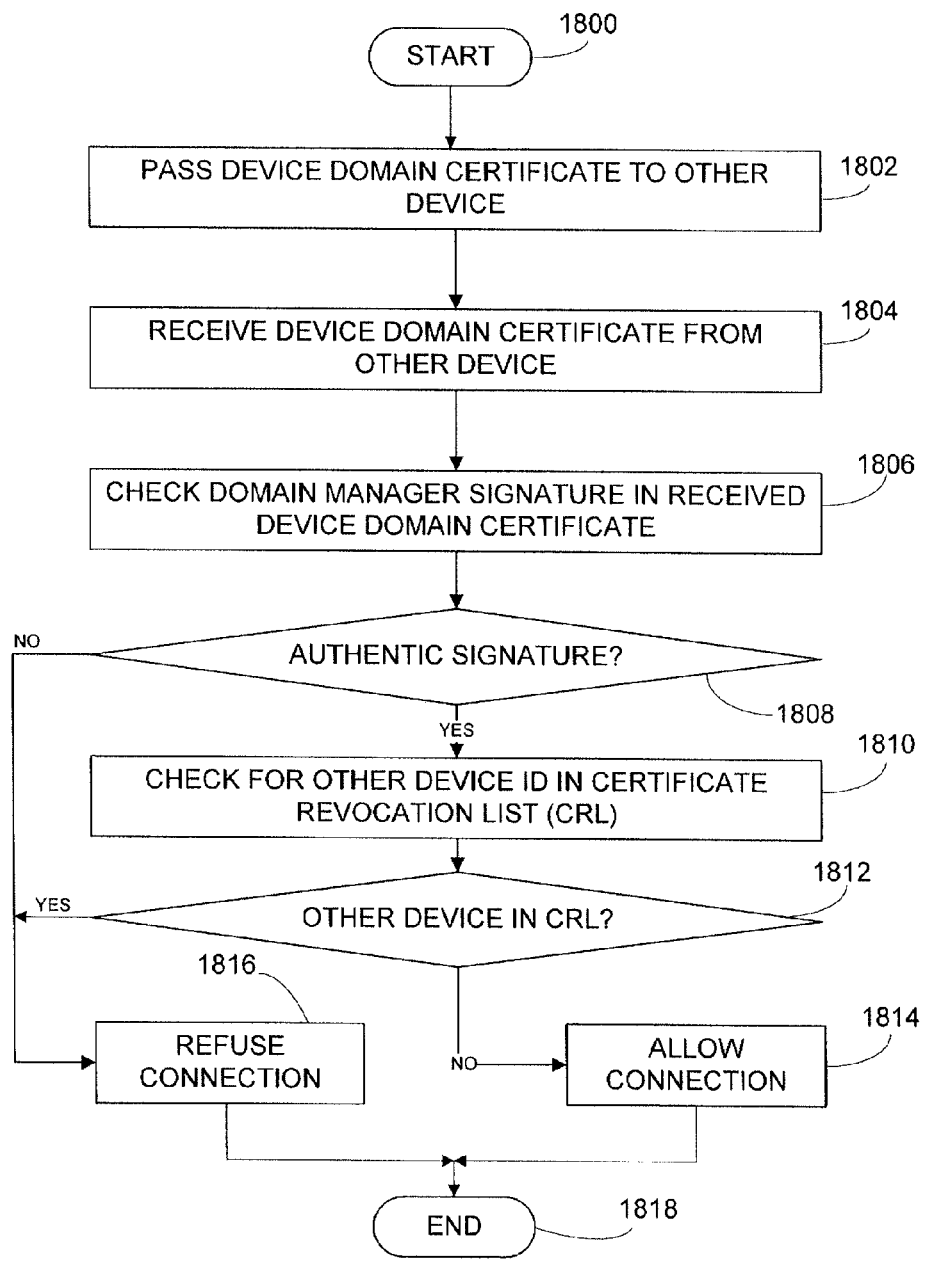
FIG. 18 is a flowchart showing a method of authenticating two devices in a device domain.

Utilizing the device domain framework described above, CE devices that are part of the device domain 404 are able to automatically authentic with each other using their respective device domain certificates 412 and share data without needing any intervention from the user. FIG. 18 is a flowchart of an exemplary process for communication between a first device (such as devices 320 from FIG. 3) and a second device (such as device 330 from FIG. 3) in the device domain 404. The process shown in FIG. 18 is typically performed by each device in the connection, e.g., the first device and the second device.

The process begins at block 1802, where the first device passes its device domain certificate 412 to the second device. At block 1804, the first device receives the device domain certificate 412 sent by the second device. At this point, the two devices have exchanged their certificates. The process then moves to block 1806 where the first device authenticates the certificate 412 that it received from the other device by checking the domain manager signature 804 using the domain manager public key 702 embedded in the device domain certificate 412. At decision block 1808, the device determines whether the signature 804 is authentic. If not, the process moves to block 1816 and the connection is refused. If, however, the signature is authentic, the process moves to block 1810, where the device checks its certificate revocation lists 414 to determine if the other device is in the list. If the other device is in the list, the process moves to block 1816, and the connection is refused. If the other device does not appear in the certificate revocation list 414, the connection is allowed. As noted above, both devices in the connection typically perform this process. If both allow the connection, then the full connection is established.

In the embodiments described above, the domain manager device 1002 is used to issue device domain certificates to new devices which are to be added into the device domain 404. As noted above, the domain manager device 1002 may be a consumer electronics device, which, like most other consumer electronics devices, may be turned off and on by the user 1006. Because the domain manager device 1002 may be turned off, there may be times when it is not available to generate and distribute new device domain certificates 412 to devices that a user 1006 wishes to add to the domain 404. Also, there may be instances where the domain manager device 1002 is unavailable for some other reason, such as being temporarily disabled or in need of repair. The domain manager 1002 could also be a mobile device such as a digital music player, and thus could be not in physical proximity to the device domain 1004. In addition, in more user-friendly environments, the user 1006 may not always be aware that a particular device is acting as the domain manager device 1002.

In order to prevent frustration for the user 1006 when they attempt to add a device to the device domain 404 when the domain manager device 1002 is unavailable, an extended device domain may be provided in order to allow certain privileged devices to have the ability to add new devices into the device domain 404. The privileged devices are issued privileged device domain certificates to indicate that they have this authority.

Figure 19:
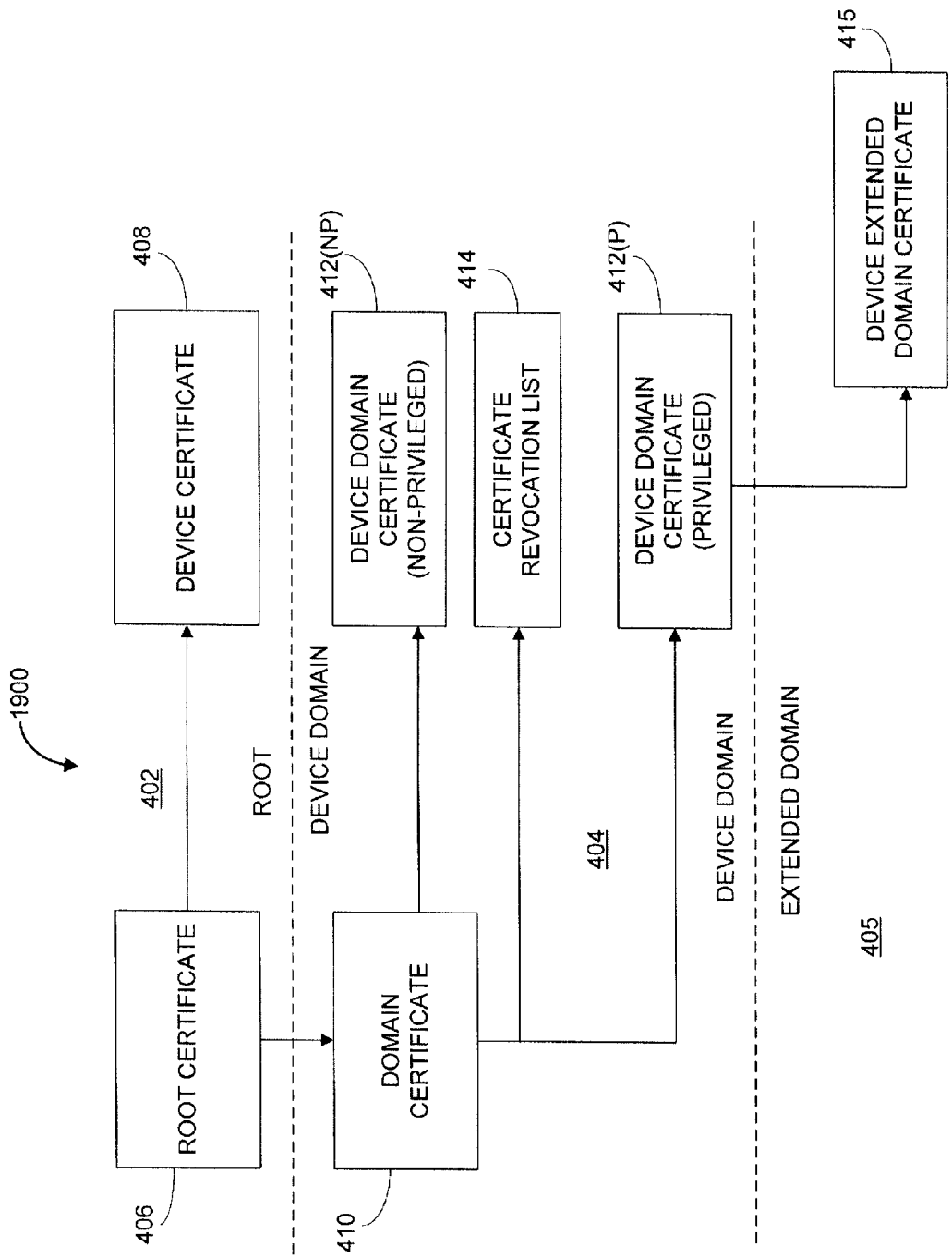
FIG. 19 is a diagram of an exemplary digital certificate chain for an extended device domain.

FIG. 19 is an example of an extended digital certificate chain 1900. The extended digital certificate flow 1900 is similar to the digital certificate chain 400 (from FIG. 4) in some respects, but it includes additional features Like the digital certificate chain 400 from FIG. 4, the extended digital certificate chain 1900 includes a root area 402 and a device domain area 404. The root area 402 includes a root certificate 406 and a device certificate 408 issued and signed by the root. Also similar to the certificate chain 400 from FIG. 4, the device domain 404 in certificate chain 1900 includes a domain certificate 410 (which, as noted above, may be the device certificate 408 of the domain manager device 1002). The device domain 404 from the extended digital certificate chain 1900 also includes a certificate revocation list 414 which maintains the list of devices that have been cancelled from the device domain 404.

In this particular embodiment, the device domain 404 includes a non-privileged device domain certificate 412(NP) and a privileged device domain certificate 412(P) issued by the domain manager device 1002 and signed using the private key of the domain certificate 410 associated with the domain manager device 1002. The non-privileged device domain certificate 412(NP) is a device domain certificate which is not allowed to issue extended device domain certificates 415 (which are disclosed below). The privileged device domain certificate 412(P) allows its associated device to issue and sign device extended domain certificates to devices added to an extended domain 405 when the domain manager device 1002 is unavailable.

Referring now to FIG. 20, an example of the field structure of device domain certificates 412(P) and 412(NP) is provided. In this particular embodiment, the field structures for privileged and non-privileged device domain certificates are similar it is the values stored in the fields which differentiate the two types of certificates. The certificate structure includes a domain coordinator identifier field 700 which stores the identity of the domain manager device 1002 for the device domain. The certificate may also include a domain coordinator public key field 702 which stores the public key for the domain manager device 1002. Also included in the device domain certificates 412(P) and 412(NP) is a device identifier 600 which stores a serial number, MAC address, or some other identifying information about the device and the public key associated with the device (as issued by the root 406). The device domain certificates 412(P) and 412(NP) also include a device public key field 602 which holds the public key associated with the device. The device domain certificates 412(P) and 412(NP) are designated as privileged and non-privilege utilizing a device privilege field 2000, which may be a store a Boolean value which is indicative of whether the device is privileged or not. The field structure of device domain certificates 412(P) and 412(NP) also includes an expiration date 2002. The device domain certificates ins the extended domain implementation also include a digital signature 2004 of the contents of the certificate.

FIG. 21 is an example of the field schema of a device extended domain certificate 415. As noted above, the device extended domain certificate is typically issued by a privileged device and signed using the privileged device's device domain certificate 412(P). The device extended domain certificate 415 shown in FIG. 21 includes the identifier of the issuing privileged device 2100. This value may be the same as the device identifier 600 stored in the privileged device domain certificate 412(P) which issued the device extended domain certificate 415. The device extended domain certificate 415 also may include the privileged device public key 2102 associated with the issuing device. As with the privileged device identifier 2100, this value may be the same as the device public key 602 stored in the issuing privileged device 412(P). The device extended domain certificate 415 also includes a device identifier field 600 and a device public key field 602. These values are typically the device identifiers and public key from the device certificate 408 of the device which is receiving the issued device extended domain certificate 415. The device extended domain certificate 415 also includes an expiration date 2104. Typically, the expiration date will be a fairly short duration from the time the certificate 415 is issued. This is because the device extended domain certificate 415 is usually intended only to be a temporary certificate that allows the device to communicate with other devices until the domain manager device 1002 becomes available to issue a device domain certificate 412. As with the other certificates in the certificate chain 1900, the device extended domain certificate 415 also includes a signature field 2106. The signature field typically stores the other fields as signed by the private key of privilege device domain certificate 412 (P) of the issuing privileged device.

Figure 22:
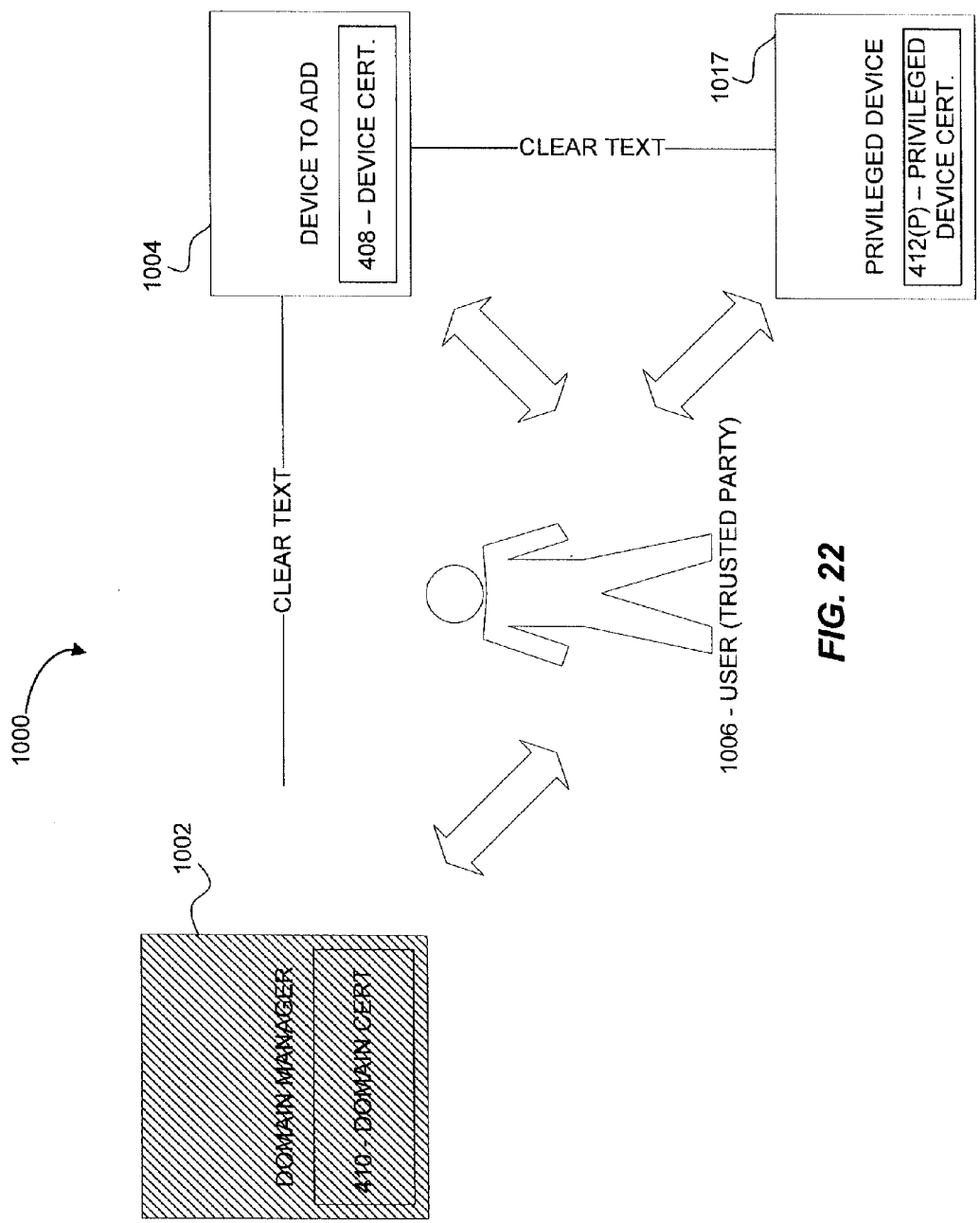
FIG. 22 is a diagram of an exemplary environment suitable for creating an extended device domain.

FIG. 22 is an example of the environment 1000 shown in FIG. 10 which has been extended to provide the ability to add devices to the device domain 404 when the domain manager device 1002 is unavailable. As shown in the figure, the domain manager 1002 and its associated domain certificate 410 are unavailable. Because of the unavailability of the domain manager device 1002, the clear text link between the device to add 1004 and the domain manager device 1002 is disconnected. As discussed above, this unavailability may be for various reasons, including powering down of the domain manager device 1002, the physical distance from the domain manager device 1002 of the other devices, or for some other reason.

Because of the unavailability of the domain manager device 1002, a privileged device 1017 is added to the environment 1000. As with the environment from FIG. 10, a user 1006 or some other trusted party is present to authenticate the various certificates exchanged between devices. The new device 1004, connects (or is connected to) the privileged device 1017. Depending upon the specific implementation environment, the new device 1004 may detect that no domain manager device 1002 is available and may then attempt to locate and connect to a privileged device as a result. Alternatively, the privileged device 1017 may detect the unavailability of the domain manager device 1002, and establish the connection to the new device 1004. Once the clear text connection has been established between the new device 1004 and the privileged device 1017, a device extended domain certificate 415 may then be issued to the new device 1004.

Figure 23:
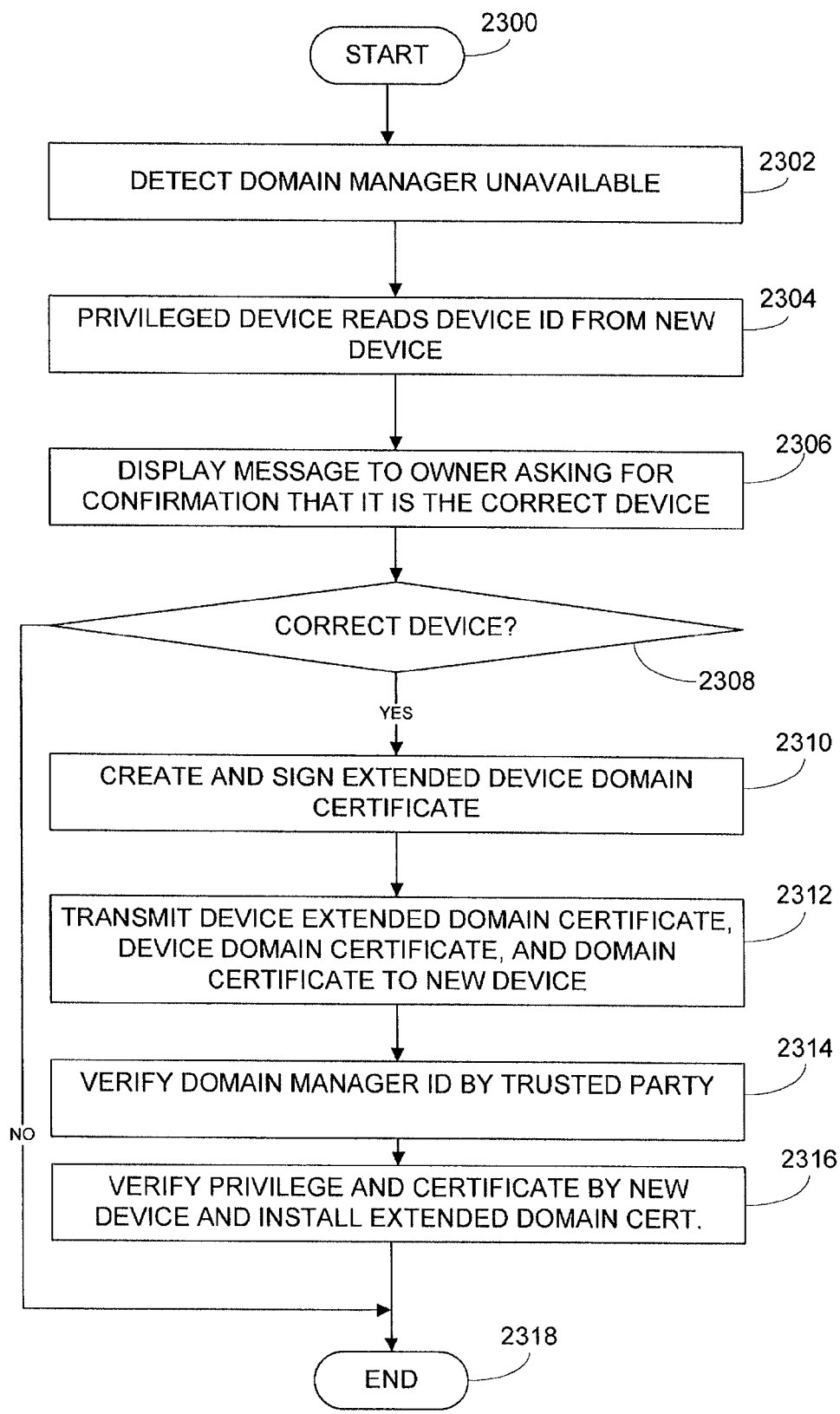
FIG. 23 is a flowchart showing a method of creating an extended device domain.

FIG. 23 is a flowchart providing an example of how a new device 1004 may be added when the domain manager device 1002 is unavailable. The privileged device 1017 initiates the process at block 2300 and immediately moves to block 2302, where it determines that the domain manager device 1002 is unavailable. Next, the process moves to block 2304, where the privileged device 1017 reads the device identifier 600 from the device certificate 408 on the new device 1004. The privileged device 1017 then displays a message to the user 1006 asking for confirmation that the new device 1004 should be added. At decision block 2308, a response to the message is provided by the user 1006. If the user 1006 does not confirm that the new device 1006 is the correct device, then the process jumps to block 2318 and terminates. If the device is the correct device, the process moves to block 2310, where the privileged device 1017 creates and signs a device extended domain certificate 415. Next, at block 2312, the privileged device transmits the device extended domain certificate 415 to the new device 1004 along with the device domain certificate 412(P) of the issuing device 1017 and the domain certificate 410 for the device domain 404. Once these certificates have been transmitted to the new device 1004, the process then moves to block 2314, where the domain manager identifier included in the domain certificate 410 is verified by a trusted party (such as the user 1006, for example). The process then moves to block 2316, where the new device 1004 verifies that the device domain certificate 412(P) is a privileged certificate, and further verifies the authenticity of the certificates using their respective public keys. Once the certificates have been verified, the new device installs all of the certificates, and the process then terminates at termination block 2318.

Figure 24:
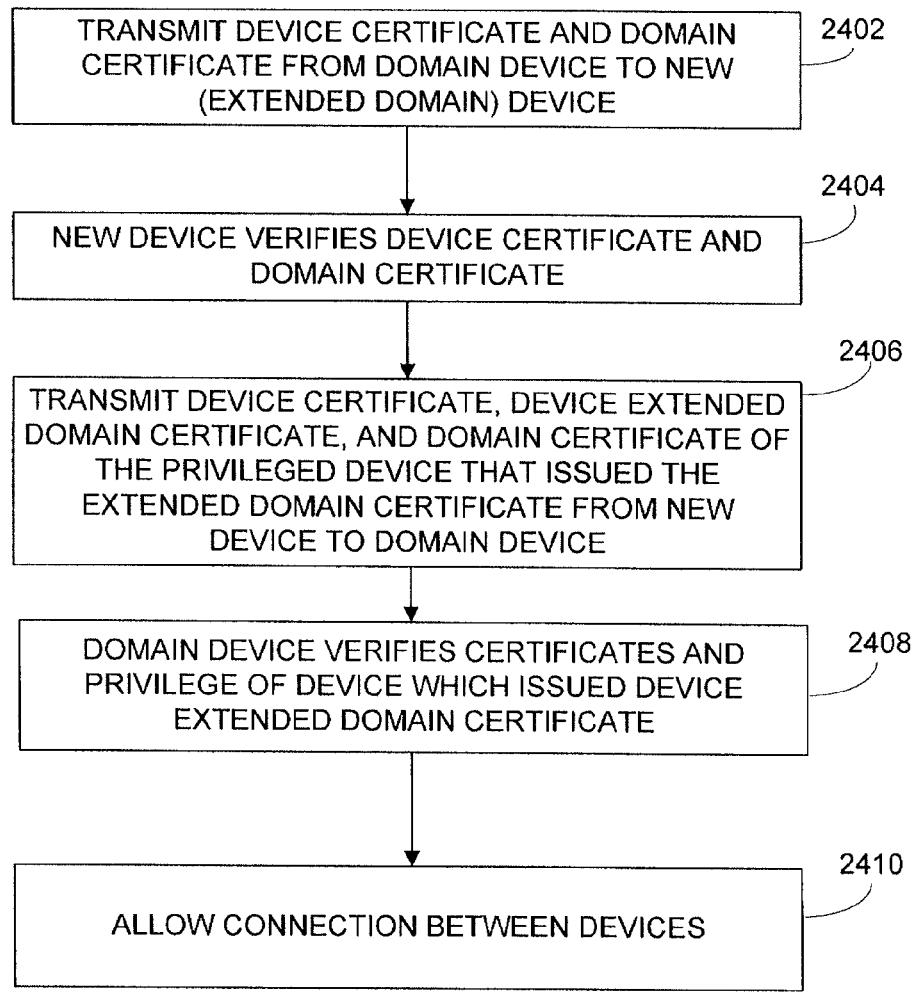
FIG. 24 is flowchart showing a method of authenticating an extended domain device into a device domain.

Once a device extended domain certificate 415 has been issued to a new device 1004, the new device 1004 can authenticate to another device in the device domain 404 via its device extended domain certificate 415 from the extended device domain 405. FIG. 24 is a flowchart which provides an example of the new device 1004 authenticating to another device (such as device 320 from FIG. 3) in the device domain 404 utilizing the device extended domain certificate 415. The process begins at block 2402 where the domain device transmits its device certificate 408 and its device domain certificate 412 to the new device 1004. The new device 1004 then verifies each of the certificates at block 2404. Next, the process moves to block 2406, where the new device 1004 transmits back to the domain device its device certificate 406, its device extended domain certificate 415, and the privileged device domain certificate 412(P) of the privileged device that issued the device extended domain certificate. At block 2408, the domain device verifies the certificates it received from the new device 1004, and also verifies that the device domain certificate 412(P) is sufficiently privileged to issue the device extended domain certificate 415. Once the verification is completed, the connection is allowed between the devices at block 2410.

Figure 25:
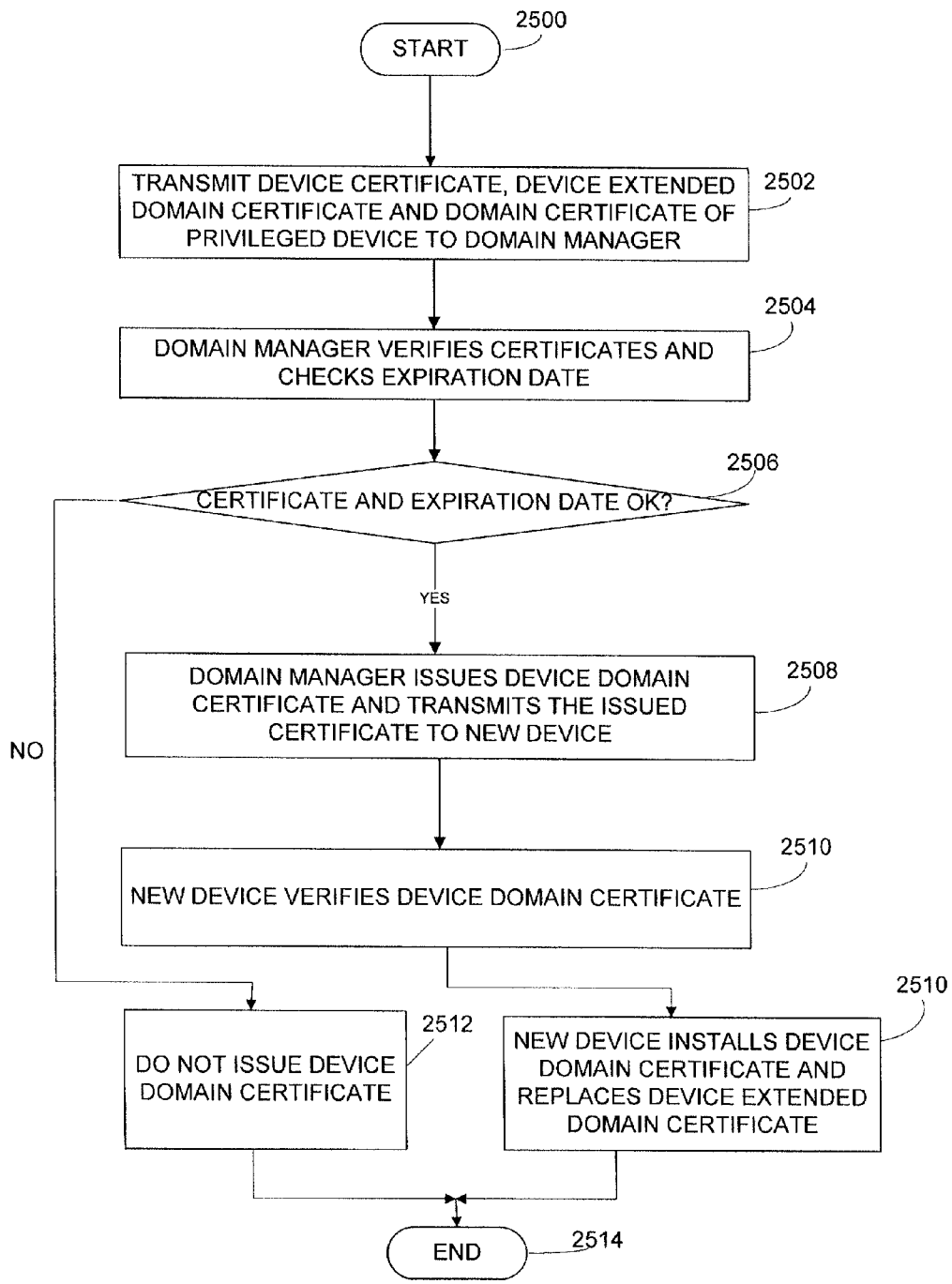
FIG. 25 is a flowchart showing a method of converting a device extended domain certificate into a device domain certificate.

As noted above, the device extended domain certificate 415 is intended to provide access to the device domain 404 when the domain manager device 1002 is unavailable to issue a device domain certificate 412 to the new device 1004. Once the domain manager device 1002 becomes available again, the device extended domain certificate can be automatically replaced by the domain manager device 1002 without intervention from the user 1006. FIG. 25 is a flowchart describing this process. The process begins at block 2502, where the new device 1004 (which has been issued device extended domain certificate 415) transmits certificates to the domain manager device 1002. The certificates transmitted to the domain manager device 1002 may include the device certificate 408 of the new device 1004, the device extended domain certificate 415, and the device domain certificate 412(P) of the privileged device that issued the device extended domain certificate.

Next, at block 2504, the domain manager device 1002 verifies each of the certificates and checks the expiration date of the certificates to ensure that they are valid. If the certificates and expirations date are not satisfactory, at decision block 2506 the process jumps to block 2512, where no device domain certificate is issued to the new device 1004. If the certificates and expiration are satisfactory, the process moves to block 2508, where the domain manager issue a device domain certificate 412 and transmits the issued certificate to the new device 1004. The issued certificate may be a privileged device domain certificate 412(P) or a non-privileged device domain certificate 412(NP). Next, at block 2510, the new device verifies the device domain certificate using the public key of the domain manager device 1002. The process then moves to block 2510 where the new device installs the verified certificate 412 and replaces the device extended domain certificate 415.

The privileged devices that are used to issue privileged device domain certificates 412(P) may be selected in various ways. In one embodiment, a privileged group is defined within the device domain 404 which includes those devices that are AC powered and non-mobile. Limited privileged devices to those that are non-mobile results in a scheme in which only users who operate the devices are able to add new devices into the extended device domain 405. In still other embodiments, both the domain manager and the privileged devices may be configured to issue temporary domain certificates which expire within a period of a few hours from issuance. These types of certificates may be used to allow a device to access the device domain a single time. Typically, the temporary device certificate cannot be converted into a normal device certificate without express permission of a trusted party such as the user 1006.

Because the domain manager device 1002 issues the device domain certificates 412 for its device domain 404, if the domain manager device becomes permanently unavailable it can have a negative impact on the usability of the device domain. For example, a device domain 404 may have a domain manager device 1002 which is a high-definition television. If the television is sold, it will need to be removed from the device domain 404. If removed permanently, no device is able to issue permanent device domain certificates to add new devices into the domain. In order to prevent this problem, a backup domain manager device may be designated by the domain manager 1002. This designation may be stored in the device privilege field 2000 of the device domain certificate 412. When the domain manager device 1002 is permanently removed from the device domain 404, the backup domain manager may take over the role of domain manager 1002 and reissue certificates to all of the devices in the domain. When the original domain manager 1002 is removed, the user 1006 may specify that the new domain manager should take over the role. However, if the user fails to provide the notification that the domain manager should be switched, the backup domain manager may be configured to detect that the previous domain manager has been inactive for a predefined length of time, and take the new role of domain manager after the time has expired. Typically, when the new domain manager takes over, the new device domain certificates 412 may be issued without any user involvement because the devices in the domain can provide the old device domain certificate 412 to the new domain manager for verification and authentication.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A method of providing a secure device domain for sharing content among a plurality of consumer electronic devices, the method comprising:

storing a domain certificate including a domain coordinator identifier, a domain coordinator public key, and a digital signature of the domain coordinator identifier and the domain coordinator public key in a memory of a first consumer electronics device;

receiving a request from a second consumer electronics device to join the secure device domain;

receiving data indicative of an approval of the request, wherein the data indicative of the approval of the request is received from a trusted party comprising a user of the second consumer electronics device;

in response to the approval of the request, issuing, by a domain manager device, a device domain certificate for the device domain to the second consumer electronics device, the device domain certificate comprising the domain coordinator identifier, the domain coordinator public key, a device identifier of the second consumer electronics device, a device public key of the second consumer electronics device, and a digital signature of the domain coordinator identifier, the domain coordinator public key, the device identifier, and the device public key; and in response to the domain manager device being unavailable for providing approval for the second consumer electronics device to join the secure device domain, the first consumer electronics device issuing an extended domain certificate for the second consumer electronics device.

2. The method of claim 1, wherein the initial communication between the first consumer device and the second consumer device comprises clear text.

3. The method of claim 2, wherein the data indicative of the approval of the request comprises data inputted by the user.

4. The method of claim 3, wherein the data inputted by the user is inputted in response to a question presented to the user on a display.

5. The method of claim 3, wherein the data inputted by the user is generated when a button on the second consumer electronics device is pressed by the user.

6. The method of claim 1, further comprising creating a certificate revocation data structure comprising at least one device identifier of a device removed from the secure device domain, a device public key of the device removed from at least one of the secure device domain or the hash value of the public key, and a digital signature of the device identifier of the device removed from the secure device domain and the device public key of the device removed from the secure device domain.

7. The method of claim 6, further comprising storing a first maximal value indicative of a total number of device domain certificates which can be issued for the secure device domain and a second maximal value indicative of a total number of unrevoked certificates issued for the secure device domain.

8. The method of claim 1, further comprising:
connecting to the second consumer electronics device after receiving the request from the second consumer electronics device to join the secure device domain;
retrieving the device certificate from the second consumer electronics device; and
verifying the authenticity of the device certificate.

9. The method of claim 8, further comprising:
extracting the device identifier from the device certificate of the second consumer electronics device; and
displaying the device identifier at the first consumer electronics device.

10. The method of claim 9, wherein the device identifier comprises at least one of a serial number and a MAC address of the second consumer electronics device.

11. The method of claim 9, wherein receiving data indicative of an approval of the request comprises receiving data indicative of a verification that the displayed device identifier is the device identifier of the second consumer electronics device.

12. The method of claim 11, wherein the received data comprises data generated in response to actuating a button on the first consumer electronics device.

13. The method of claim 12, wherein issuing the device domain certificate to the second consumer electronics device further comprises transmitting the device domain certificate over unencrypted wireless connection.

14. The method of claim 7, further comprising modifying the maximal value of unrevoked device domain certificates to reflect the issuance of the device domain certificate of the second consumer electronics device.

15. The method of claim 1, wherein the extended domain certificate comprising a device identifier and public key of the second consumer electronics device and device identifier and public key of the first consumer electronics device, wherein the second consumer electronics device is allowed to communicate with other devices within the domain based on the issued extended domain certificate.

16. The method of claim 1, wherein the first consumer electronics device lacks at least one of a keyboard and a mouse.

17. The method of claim 1, wherein the first consumer electronics device is a privileged device, and the device extended domain certificate comprising a device identifier and a public key of the second consumer electronics device and a device identifier and public key of the privileged device.

18. The method of claim 17, wherein the second electronics consumer device authenticates a third consumer electronics device via the device extended domain certificate.

19. The method of claim 18, the secure device domain includes a privileged domain certificate and a non-privileged device domain certificate.

20. The method of claim 19, wherein consumer electronics devices associated with the non-privileged device domain certificate are unable to issue extended domain certificates.

21. The method of claim 1, wherein the device identifier of the device domain certificate transmitted from the second consumer electronics device to the first consumer electronics device is modified in transit so that an encrypted value from the modified device domain certificate is distinguishable from an original encrypted value of the device domain certificate.

22. The method of claim 1, wherein the domain manager device is unavailable when it is turned off.

23. The method of claim 1, wherein the domain manager device comprises a disabled mobile device.

24. The method of claim 1, further comprising illuminating a light signal seeking confirmation from the trusted party that the device certificate is authentic.

25. The method of claim 24, further comprising selecting a button of the first consumer electronics device based on the light signal.

26. The method of claim 1, further comprising displaying a text message prompting confirmation from a user that the device certificate is authentic.

27. The method of claim 26, further comprising selecting a button or key of the first consumer electronics device based on the displayed text message.

28. The method of claim 1, wherein the secure device domain comprises a wireless local area network (WLAN).

29. The method of claim 28, wherein the WLAN comprises a home wireless network environment.

30. A method for authenticating a first consumer electronics device to a second consumer electronics device in a device domain having a plurality of consumer electronics devices, the method comprising:
  receiving a request from a second consumer electronics device to join the device domain;
  receiving data indicative of an approval of the request, wherein the data indicative of the approval of the request is received from a trusted party comprising a user of the second consumer electronics device;
  in response to the approval of the request, issuing, by a domain manager, a device domain certificate for the device domain to the second consumer electronics device;
  in response to the domain manager device being unavailable for providing approval for the second consumer electronics device to join the device domain, the first consumer electronics device issuing an extended domain certificate for the second consumer electronics device;
  receiving, at the first consumer electronics device, a device domain certificate from the second consumer electronics device;
  verifying, at the first consumer electronics device, a domain manager's signature of the received device domain certificate;
  comparing, by the first consumer electronics device, data extracted from the received device domain certificate to a certificate revocation list; and
  establishing, by the first consumer electronics device, a connection with the second consumer electronics device if the data extracted from the device domain certificate is not found in the certificate revocation list.

31. The method of claim 30, further comprising blocking, by the first consumer electronics device, the connection with the second consumer electronics device if the data extracted from the device domain certificate is found in the certificate revocation list.

32. A system for providing a secure domain for sharing content among a plurality of consumer electronic devices, the system comprising:
  a hardware processor coupled to an electronic device configured for forming:
    a domain certificate data structure including a domain coordinator identifier, a domain coordinator public key, and a digital signature of the domain coordinator identifier and the domain coordinator public key;
    a device domain certificate data structure including the domain coordinator identifier, the domain coordinator public key, a device identifier, a device public key, and a digital signature of the domain coordinator identifier, the domain coordinator public key, the device identifier, and the device public key;
    a certificate revocation data structure comprising at least one device identifier of a device removed from the secure domain, a device public key of the device removed from the secure domain, and a digital signature of the device identifier of the device removed from the secure domain and the device public key of the device removed from the secure domain;
    a first maximal value data structure comprising a total number of device domain certificates which can be issued for the domain and a second maximal value data structure comprising a total number of unrevoked certificates issued for the domain, wherein the first maximal value is determined based on a function of the second maximal value; and
    a device extended domain certificate comprising a device identifier and a public key of a new consumer electronics device to the secure domain and a device identifier and public key of a privileged device for authenticating the new consumer electronics device,
  wherein a first consumer electronics device issues the device extended domain certificate for a second consumer electronics device in response to a domain manager device being unavailable for providing approval for the second consumer electronics device to join the secure device domain.

33. The system of claim 32, wherein the extended domain certificate comprising a device identifier and public key of the second consumer electronics device and device identifier and public key of the first consumer electronics device, wherein the second consumer electronics device is allowed to communicate with other devices within the domain based on the issued extended domain certificate.

34. A device for managing access to a consumer electronics device domain, comprising:
  a processor;
  domain management instructions stored on a non-transitory storage medium, which when executed by the processor cause the processor to execute the instructions to:
    receive a device certificate from a consumer electronics device to be added to the device domain;
    display a message on the device seeking confirmation from a user acting as a trusted party that the device certificate from the consumer electronics device is authentic;
    generate a device domain certificate in response to data input, the device domain certificate comprising data identifying the consumer electronics device domain and the device; and
    transmit an extended domain certificate along with issuing the device domain certificate and a domain certificate for the consumer electronics device domain to the consumer electronics device;
  wherein a first consumer electronics device issues the extended domain certificate for a second consumer electronics device in response to a domain manager device being unavailable for providing approval for the second consumer electronics device to join the device domain.

35. The device of claim 34, wherein the received data input is received from the user acting as the trusted party and is input via a binary input mechanism on the device.

36. The device of claim 35, wherein the binary input mechanism is a button on the exterior of the device.

37. The device of claim 36, wherein the message seeking confirmation is displayed by flashing the button on the device.

38. The device of claim 37, wherein the device is one of a dedicated domain management device and a high definition television device.

39. The device of claim 37, wherein the device is a high definition television device.

40. A method of providing a secure device domain for sharing content among a plurality of consumer electronic devices, the method comprising:

storing a domain certificate including a domain coordinator identifier, a domain coordinator public key, and a digital signature of the domain coordinator identifier and the domain coordinator public key in a memory of a first consumer electronics device;

receiving a request from a second consumer electronics device to join the secure device domain;

receiving data indicative of an approval of the request, wherein the data indicative of the approval of the request is received from a trusted party comprising a user of the second consumer electronics device;

in response to the approval of the request, issuing, by a domain manager, a device domain certificate for the device domain to the second consumer electronics device, the device domain certificate comprising the domain coordinator identifier, a device identifier of the second consumer electronics device, and the signature of a hash value; and in response to the domain manager device being unavailable for providing approval for the second consumer electronics device to join the secure device domain, the first consumer electronics device issuing an extended domain certificate for the second consumer electronics device.

41. The method of claim 40, wherein the hash value comprises the hash of the concatenation of device identifier of the second consumer electronics device, the domain coordinator identifier, and a public key of the second consumer electronics device.

42. The method of claim 41, wherein the signature of the hash value is generated using a private key associated with the first consumer electronics device.

* * * * *